(12) United States Patent
Dingman et al.

(10) Patent No.: US 6,820,135 B1
(45) Date of Patent: *Nov. 16, 2004

(54) MODELESS EVENT-DRIVEN DATA TRANSFORMATION

(75) Inventors: Paul C. Dingman, Austin, TX (US); Kathryn E. Van Dyken, Round Rock, TX (US); William G. Bunton, Austin, TX (US); Thomas Landrum, Austin, TX (US)

(73) Assignee: Pervasive Software, Inc., Austin, TX (US)

( * ) Notice: Subject to any disclaimer, the term of this patent is extended or adjusted under 35 U.S.C. 154(b) by 368 days.

This patent is subject to a terminal disclaimer.

(21) Appl. No.: 09/974,747

(22) Filed: Oct. 10, 2001

Related U.S. Application Data

(63) Continuation-in-part of application No. 09/652,473, filed on Aug. 31, 2000.

(51) Int. Cl.[7] .............................................. G06F 15/16
(52) U.S. Cl. ...................... 709/246; 709/202; 709/217; 709/219; 709/232; 707/101; 707/102; 707/203
(58) Field of Search ................................ 709/202, 217, 709/219, 232, 246; 707/101, 102, 203, 10

(56) References Cited

U.S. PATENT DOCUMENTS

| | | | |
|---|---|---|---|
| 5,970,490 A | 10/1999 | Morgenstern | |
| 6,029,178 A | 2/2000 | Martin et al. | |
| 6,032,147 A | 2/2000 | Williams et al. | |
| 6,035,307 A | 3/2000 | Martin et al. | |
| 6,085,196 A | 7/2000 | Motoyama et al. | |
| 6,351,761 B1 * | 2/2002 | Cantone et al. | 709/202 |

OTHER PUBLICATIONS

B2Systems, Inc., "SQL Integrator," XML Whitepaper, 1999.
TSI International Software Ltd., "Mercator E–Business Integration Broker Software in an SAP Environment," Mar. 2000.
Lecluse, "Event Driven or Tree Manipulation Approaches to SGML Transformation: You Should Not Have to Choose," Nov. 1996.

* cited by examiner

*Primary Examiner*—Nabil El-Hady
(74) *Attorney, Agent, or Firm*—Charles D. Huston; Mollie E. Lettang; Conley Rose P.C.

(57) ABSTRACT

A system and method is described for event-driven data transformation. Generally, the system and method is directed to a transformation engine that iterates through one or more data sources, transforms data received from the data sources, and stores the output to one or more data targets. More specifically, the transformation engine is driven by executing specified event actions upon occurrence of specified triggering events. Thus, flexible, adaptable, highly tailored transformations can be implemented without incurring the often substantial expense of developing customized point-to-point solutions from scratch. The present invention supports one-to-one mappings, many-to-one mappings, one-to-many mappings, and many-to-many mappings. In addition, the present invention supports both hierarchical and flat data sources and targets.

20 Claims, 8 Drawing Sheets

MODELESS EVENT-DRIVEN DATA TRANSFORMATION

CROSS REFERENCE TO RELATED APPLICATIONS

The present invention is a continuation-in-part of copending U.S. application Ser. No. 09/652,473, filed Aug. 31, 2000, titled "System and Method for Event-Driven Data Transformation." This benefit of 35 U.S.C. 120 is claimed for the above referenced commonly owned application, which is hereby incorporated by reference.

BACKGROUND OF THE INVENTION

Databases play an integral role in the information systems in most major organizations. Databases may take many forms, and play many roles such as a mailing list, an accounting spreadsheet, or statistical sales projections. After using several generations of technology, most organizations of any size have data stored in many different systems and formats. However, the increasing pace of competition is putting the onus on the organizations to build seamless bridges that combine the dizzying array of data sources quickly and cost-effectively into meaningful information.

In addition, increased opportunities brought by the World Wide Web (the "Web") add to the pressure of providing access to that information in a useful and efficient manner. For example, organizations may need to transform raw data and stage it to separate, redundant web servers for quick access via multi-tier application architectures designed for thin clients. Alternatively, organizations may need to couple their systems via XML across the web with the systems of other organizations.

At the heart of nearly every Web-based business is the need to transform and integrate data. Because of the wide range of formats and applications within which business objects, transactions, catalog content and log files may be stored, data integration is perhaps the most painful and complex challenge facing business persons and application developers alike. The pain is most sharp in common scenarios that involve multiple trading partners with each partner having different internal production systems and different protocols for exchanging data.

Regardless of the particular need, organizations desiring to participate in any sort of e-commerce venture will likely have to deal with staging data from disparate sources. For example, an organization may need to combine information from multiple Internet systems along with external text feeds to build a customer relationship management system; or to integrate the organization's systems with those of customers and suppliers across the value chain. To be successful, an organization must transform data into useable formats for internal departments, partners, and customers.

To make data available and meaningful for different recipients, data transformation is often necessary. Data transformation generally refers to a sequence of operations that transforms a set of input data into a set of output data. Though the term data conversion has a slightly different technical connotation, it is often used synonymously with the term data transformation. Data transformation allows for the changing of the content, format, or data structure. Common content changes include adding, deleting, aggregating, concatenating, and otherwise modifying existing data. Common data formats include binary files, sequential files, embedded binary data, EBCDIC data from mainframes, common file types created by C, COBOL, FORTRAN, Basic, RPG, Pascal, and other languages, arrays, ISAMs and other record managers, PC-based databases, accounting applications, and Web-based data reachable through SQL/ODBC. Common data source structures may include spreadsheets, contact managers, mail list software, and statistical packages.

The process of converting data becomes increasingly complicated with each increase in the number of input data sources, the number of output data sources, the content of the data sources, the format of the data sources, and the complexity of data structures. For example, different data storage systems use data structures with different structures. For example, mainframe systems typically use a hierarchical data storage method, whereas client-server systems often use a relational database storage method.

Current data transformation techniques are generally expensive to implement, are not portable, and difficult to adapt to new or changing circumstances. For example, point-to-point links are generally hand-coded customized data transformation programs. Customized code is typically written in-house and is specific to a single application or DBMS environment. On the positive side, such solutions generally provide exactly what is needed and no more, and address requirements for which there may be no off-the-shelf products. In-house development, testing and debugging also narrows the focus, and tends to produce a workable, if non-versatile, solution. On the other hand, because these routines are usually specific to a particular source or target database, they are difficult to port to other environments. These routines may also be difficult to repeat because the routines are generally unique to each situation and because there is typically no infrastructure in place to manage the processes. Finally, building custom routines robs in-house DBAs of time better spent on other tasks. In addition, custom coded solutions require continued maintenance because they must be modified every time a new requirement is added to the system Further, custom code may take a relatively long time to implement with some legacy migration projects tying up critical IT staff for weeks, months and even years.

Consultants and customized tools are also used by organizations with increasing frequency today. Outside consultants typically have acquired extensive experience in building data models, designing movement and transformation methodologies and developing transformation tools. Such tools tend to be more portable, since they have been developed with multi-platform DBMS environments in mind. Because database consultants have had to become knowledgeable about business operations as well, these tools also tend to address business processes adequately. However, all application expertise leaves along with the consultant. In addition, because these routines are specific to single aspects of the business, they are difficult to recreate for other branches or divisions.

A common alternative to point-to-point links involves streaming data through a conduit into a universal structure, transforming the data in a central hub, then streaming the data through another conduit to the target format. Transforming the data may happen in real time but requires downloading the structure into memory to make it possible to apply a consistent set of visually defined transformation capabilities to an intermediate data stream regardless of the data's original format or transformed format. This method generally requires less programming code than point-to-point links. However, the architecture tends to limit transformation operations, and less efficient versions increase latency and complicate scalability. Further, loading the entire source structure into memory may become prohibitive with large and complex structures.

The use of an iterative method addresses this last concern. Iterative data transformation methods do not require the use of large amounts of memory that loading the entire structure requires, because source data is examined one record at a time. However, with current iterative methods, it is difficult to keep track of the relationship between records.

Another relatively new technology, XML, has lured application developers with the promise of an easier way to integrate data between applications and between organizations over the Internet. However, as organizations rush to adopt progressive e-business infrastructures such as XML to gain an edge over the competition, they are stumbling upon an unsettling reality. Since the W3C released the public specifications for XML in 1998, vertical industries and major corporations have already implemented hundreds of disparate XML "standards." Thus, a big hurdle for trading partners, developers, and net market makers that need to interface with multiple production systems and organizations is the wide range of XML standards (as well as other data formats) that they will likely encounter.

Data transformation tools currently in use are generally expensive, time-consuming to implement, programming-intensive, and inflexible. An ideal data transformation tool requires a minimum amount of custom programming, has the flexibility to work with varied data formats, contents, and structures, and possesses the capability to adapt to different sources and targets.

GLOSSARY

The following illustrative explanations are provided to facilitate understanding of certain terms used frequently herein, particularly in the Description of Illustrative Embodiments. The explanations are provided as a convenience and are not limitative of the invention.

column—the container for a single item of information in a row. Also known as field.

database—one or more structured sets of persistent data, usually associated with software to update and query the data. A simple database might be a single file containing many records, each of which contains the same set of fields where each field is a certain fixed width.

Data Definition Language (DDL)—those text commands that define, as opposed to manipulate, data. For example, the SQL statements CREATE TABLE, CREATE INDEX, GRANT, and REVOKE.

Data Manipulation Language (DML)—those text commands that manipulate, as opposed to define, data. For example, the SQL statements INSERT, UPDATE, DELETE, and SELECT.

database management system (DBMS)—a software system for managing databases. These systems typically provide mechanisms for creating databases, defining objects in the database (tables, views, etc.), manipulating data (inserts, updates, queries), and controlling access to data (security).

electronic data interchange ("EDI")—in common usage, generally refers to either the ANSI standard (X12) or the ISO EDIFACT (Electronic Data Interchange for Administration Commerce and Transport) standard formats.

event—an occurrence of significance to a particular task.

field—sometimes defined as the smallest addressable piece of a record, for both defining record layouts or structures and for access data in a data record.

file—a named collection of data which is stored or processed as a single logical unit. Files are generally subdivided into one or more types of records, which are themselves subdivided into fields. See also field, and records.

file layout—the organization of the data within a file. Describes the types of records used in the file. See also file, and records.

fixed-length data type—a data type that is always stored in the same number of bytes, such as a two-byte integer. See also variable-length data type.

foreign key—a column or columns in a table that match the primary key in another table.

key—a column or columns whose values identify a row.

HDS—HDS is a file-based hierarchical data system designed for the storage of a wide variety of information. It is particularly suited to the storage of large multi-dimensional arrays (with their ancillary data) where efficient access is needed. HDS organizes data into hierarchies, broadly similar to the directory structure of a hierarchical filing system, but contained within a single HDS container file. The structures stored in these files are self-describing and flexible; HDS supports modification and extension of structures previously created, as well as deletion, copying, renaming, etc. All information stored in HDS files is portable between the machines on which HDS is implemented. Thus, format transformation problems when moving between machines are minimized.

Hypertext Markup Language ("HTML")—an application of SGML that uses tags to mark elements, such as text or graphics, in a document to indicate how Web browsers should display these elements to the user and should respond to user actions such as activation of a link by means of a key press or mouse click. HTML is used for documents on the World Wide Web. HTML 2.0, defined by the Internet Engineering Task Force ("IETF"), includes features of HTML common to all Web browsers as of 1995, and was the first version of HTML widely used on the World Wide Web. Future HTML development will be carried out by the World Wide Web Consortium ("W3C"). HTML 3.2, the latest proposed standard, incorporates features widely implemented as of early 1996. A description of SGML and HTML features is given in Bradley, N., The Concise <SGML> Companion, Addison Wesley Longman, New York, 1997, which is incorporated herein by reference.

Indexed Sequential Access Methods ("ISAMs")—a record management system that provides support both for sequential access and for indexed retrieval of the records by key values.

metadata—data about data that informs users how data arrived in the data store, how the data is laid out, where it came from, and/or how it was transformed.

object-oriented database (OOBD)—a system offering database management facilities in an object-oriented programming environment. Data is stored as objects and can be interpreted only using the methods specified by its class. The relationship between similar objects is preserved (inheritance) as are references between objects.

query—a user's (or agent's) request for information, generally as a formal request to a database or a search engine. SQL is the most common database query language.

record—a collection of data items arranged for processing by a program. Multiple records are contained in a file or data set. The organization of data in the record is usually prescribed by the programming language that defines the record's organization and/or by the application that processes it. Typically, records can be of fixed-length or variable length with the length information contained within the record.

relational database—a database based on the relational model developed by E. F. Codd. A relational database allows the definition of data structures, storage and retrieval operations, and integrity constraints. In such a database, the data and relations between them are organized in tables. A table is a collection of records and each record in a table contains the same fields. Certain fields may be designed as keys, which means that searches for specific values of that field will use indexing to speed them up. Records in different tables may be linked if they have the same value in one particular field in each table.

row—a set of related columns that describe a specific entity. Also known as a record.

SAP Intermediate business Document ("IDOC")—an interchange format based on EDI used by SAP AG applications such as SAP R/3.

schema—a database object that contains one or more tables, often created by a single user.

session—an OLE DB object that serves as the context for a transaction.

Standard Generalized Markup Language ("SGML")—an information management standard adopted by the International Organization for Standardization ("ISO"), as ISO 8879:1986, as a means for providing platform-independent and application-independent documents that retain content, indexing, and linked information. SGML provides a grammar-like mechanism for users to define the structure of their documents and the tags they will use to denote the structure in individual documents. A complete description of SGML is provided in Goldfarb, C. F., The SGML Handbook, Oxford University Press, Oxford, 1990, and McGrath, S., Parseme.1st: SGML for Software Developers, Prentice Hall PTR, New Jersey, 1998, which are incorporated herein by reference.

standard query language (SQL)—a language which provides a user interface to relational database management systems, developed by IBM in the 1970s for use in System R. SQL is the de facto standard, as well as being an ISO and ANSI standard. It is often embedded in other programming languages.

transaction—an atomic unit of work. The work in a transaction must be completed as a whole; if any part of the transaction fails, the entire transaction fails.

transaction isolation—the act of isolating one transaction from the effects of all other transactions.

transaction isolation level—a measure of how well a transaction is isolated.

truncate—to discard one or more bytes of variable-length data or non-significant digits of numeric data. Truncation results in a warning condition when getting data and a error condition when setting data.

Uniform Resource Identifier (URI)—the generic term for all types of names and addresses that refer to objects on the World Wide Web. A URL is one kind of URI.

value—a data value.

variable-length data type—a data type for which the length of the data can vary, such as a string. See also fixed-length data type.

eXtensible Markup Language ("XML")—a subset of SGML defined by W3C as a method for putting structured data into a text file.

SUMMARY OF THE INVENTION

In one broad respect, the present invention is directed to a system for data transformation comprising one or more read spokes with each read spoke configured to connect to one or more data sources, each data source having one or more data structures referred to collectively as source structures; one or more modeless write spokes with each modeless write spoke configured to connect to one or more data targets, each data target having one or more data structures referred to collectively as target structures; and a transformation engine operatively coupled to the one or more read spokes for retrieving data from the one or more data sources, and coupled to the one or more modeless write spokes for storing data in the one or more data targets, with the transformation engine comprising a transformation map that comprises one or more mappings that relates one or more source structures to one or more target structures and an event list comprising one or more event actions, each with a corresponding triggering event, and the transformation engine is configured to iterate through the data sources and detect occurrences of triggering events and execute the respective one or more event actions from the event action list in response to the detection of a triggering event. In a narrow respect, the transformation engine further comprises a query language preprocessor operable to review the data transformation map and evaluate embedded expressions in the one or more mappings. In another narrow respect, at least one of the event actions (called a "transformation event action") comprises retrieving at least source structure from the data source, transforming data from at least one source structure (called "transformed source data"), and storing the transformed source data into one or more target structures, with the transformation engine operable, in response to a transformation event action, to transform data specified by the transformation event action in a manner described by the data transformation map. In another narrow respect, a user interface is configured to allow a user to define the one or more data sources, and to define data structures in each of the one or more source databases. In another respect, a user interface is configured to allow a user to define the one or more data targets, and to define data structures in each of the one or more target databases. In yet another respect, a user interface is configured to allow a user to define the relationship between one or more data sources and one or more data targets. In a narrower respect, the user interface allows the user to relate source data structures to target data structures. In particular, the user interface comprises a display configured to graphically depict the relation between the source structures and the target structures specified in the transformation map. In another narrower respect, the user interface is configured to define the relationship between one or more data sources and one or more data targets as a logical expression and/or as a numeric expression. In another narrow respect, the transformation engine includes a display configured to show the contents of the data source and the contents of the data structure. In other respects, the triggering event is a generic source event, a generic target event, a generic transformation event, or a specific source record event. In yet another narrow respect, the transformation engine may also be configured to filter the data retrieved from the data 11 source, referred to as filtered source data, and can be further configured to iterate only through the filtered source data. In narrower respects, the transformation engine filters the data using predetermined sampling parameters governing a range or sample, or using predetermined logical extraction criteria. In yet other respects, the read spokes connect to the one or more data sources by utilizing a raw sequential mode such that an intuitive visual parser reconstructs record layouts, or by utilizing a compatible physical file format allowing the transformation engine to physically read from the data sources using the native internal storage format.

DESCRIPTION OF ILLUSTRATIVE EMBODIMENTS

The present invention addresses the shortcomings of the prior art with an event-driven transformation engine. As used in the present invention, the term "a" is used to mean "one or more."

The typical prior art technique used by many of the data transformation and data-loading utilities is a three step process that includes reading a record, evaluating a mapping to move the source field data to the target fields, and writing the record to the target. This process is repeated for each record in the data source, defining a very static process whereby one expects one target record to be written for each source record. Applications requiring updates to multiple targets would require multiple passes over the source data and in some cases would involve staging the data to intermediate data stores.

The event-driven system and method of the present invention is more flexible and can be easily customized to fit the needs of a given situation. In particular, the present invention allows for the simultaneously updating of multiple target databases with a single pass of the data source. The present invention handles event actions in a flexible manner, allowing, for example, each of the multiple targets to get the exact same data (i.e., a single mapping and multiple writes) or each target to receive data in a customized manner (i.e., multiple maps and writes). This functionality has applications for data synchronization and replication in addition to traditional data transformation applications.

Further, the traditional technique is generally limited to applications where the source data is homogenous. Multiple record types could be handled using filtering but would require making multiple passes over the source data. A drawback to this approach is that converting the data in a piecewise, multi-pass fashion makes it hard if not impossible to maintain relationships between the different record types.

Systems of the present invention allow for heterogeneous data manipulation operations on multiple objects in a database management system. For example, a transformation can be set up so that different kinds of data will trigger different events. The event processing can handle hierarchical data, data with mixed record types, sequential report data (data with header, detail, and trailer records). Further, the use of events make it easy to aggregate data, route data to different kinds of targets, or to change the structure of the data on multiple levels. Still further, in some embodiments of the present invention, the heterogeneous data manipulation on multiple objects in the DBMS may be done in a single transformation pass.

Figure 1:
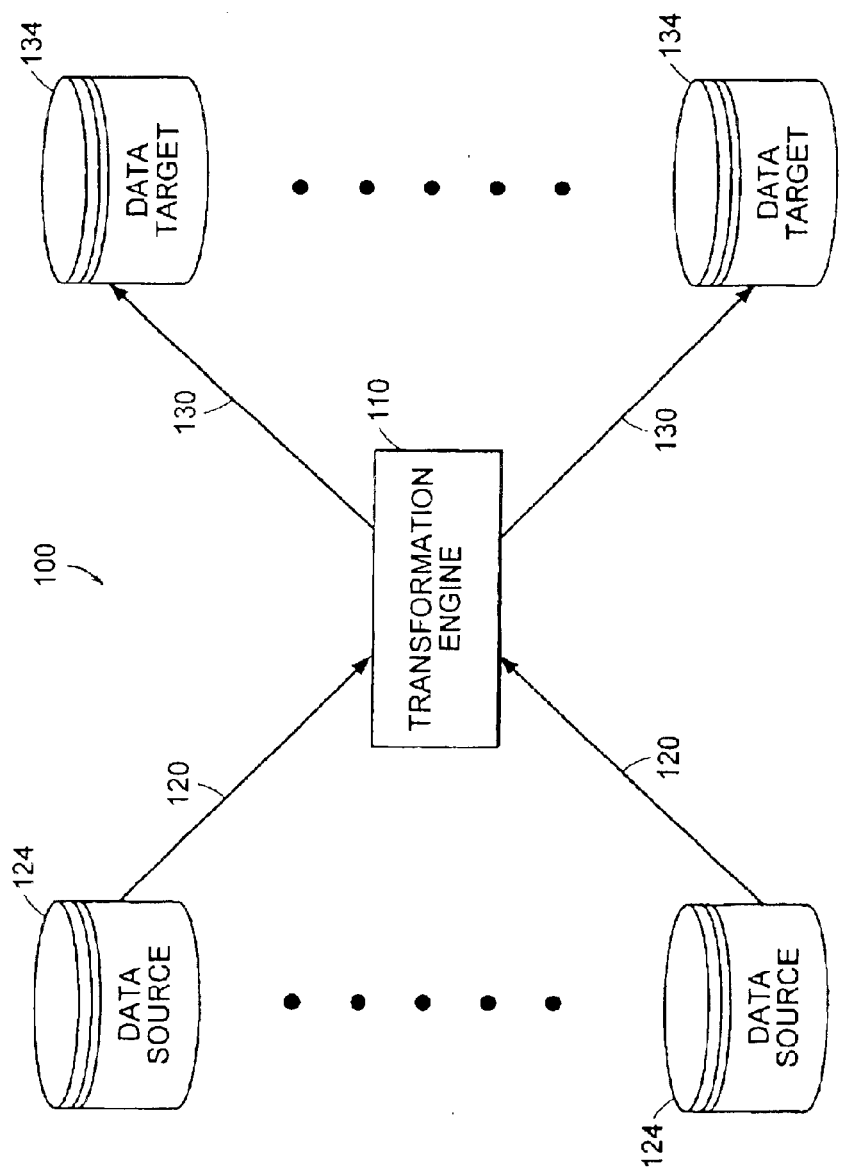
FIG. 1 is a high-level block diagram of a data transformation system according to an embodiment of the present invention.

FIG. 1 illustrates a transformation system 100 according to one embodiment of the present invention. As shown, transformation system 100 employs a modular hub and spoke architecture. A hub and spoke architecture is well-suited for data transformation because it permits infinite extensibility, both in the power of the central transformation engine, as well as the richness of formats supported by the spokes. Though a hub and spoke architecture is used with the claimed system of the present invention, the present invention contemplates the use of other architectures with the claimed method without departing from the scope of the invention.

The hub is a data transformation engine 110, which functions generally to read and transform various types of structured data. Read spokes 120 and write spokes 130 are operatively coupled to transformation engine 110, serving as the interface between transformation engine 110 and data sources 124 and data targets 134, respectively. As used in the present invention, a spoke is a data access adapter for one or more specific types of data. The spoke objects provide the necessary information to allow transformation engine 110 to retrieve and write data to the data structures in a source or target. The specific information that a spoke requires depends on the type of data and the data structure. Preferably, transformation system 100 has preprogrammed spokes for many of the common data formats and DMBSs, including, but not limited to, Oracle, IBM DB2, Microsoft SQL Server, dBase, XML, delimited ASCII, and fixed ASCII. In addition, spokes may also be implemented for providing access to data through various middleware products such as OLE DB and ODBC, and through a variety of application programming interfaces such as Remedy ARS. It is noted that the present invention is not limited to the use of any one or set of specific data types. Spokes can be developed for any data type and structure, thereby allowing transformation engine 110 to interface with any data type and structure.

In many applications, data sources 124 and data targets 134 may be databases having objects, with records and fields. However, the present invention is compatible with any store of data, that incorporate any type of data structures, including without limitation data stored in random access memory, data in a data stream, a result of a query against a DBMS, an electronic message, and an application programming interface.

Preferably, transformation engine 110 operates in real-time, meaning that it is capable of connecting to and passing records to and from sources 124 and targets 134 without using an intermediate file. Thus, while data passes through the transformation engine 110, it can be massaged on the fly into the exact output format required. The types of transformation performed by transformation engine 110 are not limited by the present invention, and are discussed below in detail.

In one embodiment, transformation system 100 may be written in C++. In particular, the elements (transformation engine 110 and read spokes 120 and write spokes 130) may be C++ code wrapped as Windows DLLs and COM components. Consequently, transformation system 100 may be a portable, cross-platform, expandable data transformation solution that may be incorporated into complementary products.

Figure 2:
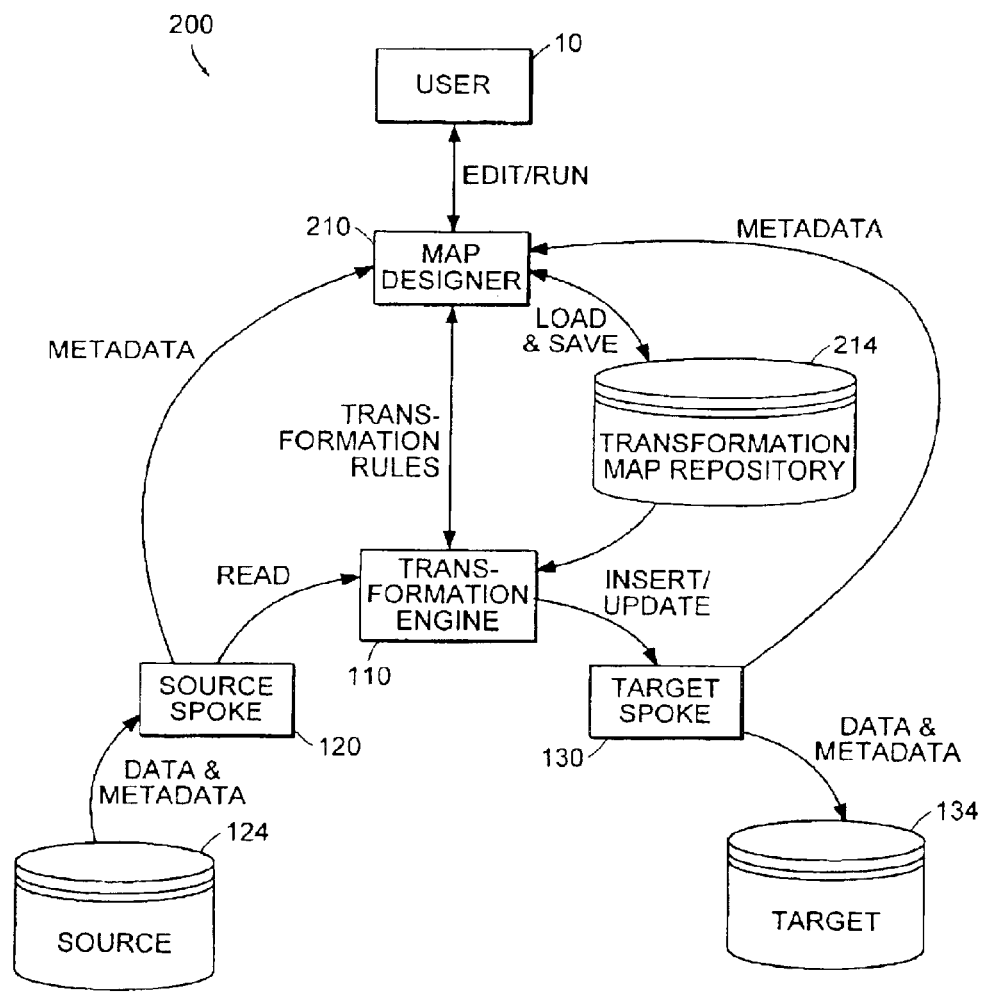
FIG. 2 is a detailed object oriented block diagram of a data transformation system according to an embodiment of the present invention.

FIG. 2 is an object-oriented block diagram of a more detailed transformation system 200 according to an embodiment of the present invention. As shown, transformation system 200 may include a map designer 210, a transformation map repository 214, transformation engine 110, source spokes 120 and target spokes 130.

Map designer 210 provides an interface that permits user 10 to specify the relationships between data (called "mappings") retrieved from source 124 and written to target 134. In some embodiments, this interface may allow the mappings to be established graphically. In other embodiments, the mappings may be specified as a set of one or more expressions or rules. In yet other embodiments, a default set of mappings may be used in the absence of the user input. In one particular embodiment, the default mapping is a one-to-one mapping between the source 124 and the target 134.

As illustrated, mappings may be stored in and loaded from transformation map repository 214. Though transformation map repository 214 is depicted, its inclusion with the present invention is optional. When included, however, it allows user 10 to reuse, adapt, and/or improve upon previously specified mappings.

In many instances, information about data source 124 and data target 134 can be drawn from an external repository or database catalog, copied from a previously executed data flow, or defined interactively. Underlying such functionality is metadata, which in its broad definition is data about data that informs users how data arrived in the data store, how the data is laid out, where it came from, and/or how it was transformed. In the illustrative embodiment, map designer 210 provides user 10 with metadata about data source 124 and data target 134, retrieved by their respective spokes 120 and 130. In one particular embodiment, map designer 210 integrates and blends the metadata into the design interface, allowing user 10 to make use of it when specifying the mapping. Further, metadata may also be generated and stored with each transformation map stored in transformation map repository 214. The information provided by metadata varies depending on its origin and the object that it describes. However, in this type of application, metadata may typically include, without limitation, the specifications of a transformation; the data structures of data source 124 and data target 134; and information regarding system changes and the accomplishment of transformation goals.

When a transformation is executed, transformation engine 110 retrieves the applicable transformation rules from either the map designer or the transformation map repository. Transformation engine 110 then directs source spoke 120 to retrieve the applicable data from source 124. Transformation engine 110 performs the necessary functions on the data and then sends the data to target spoke 130 to be stored in target 134 as specified by the transformation rules in the transformation map.

In some embodiments (not shown), the transformation system 200 may also include a real-time source/target monitor that displays the contents of both source 124 and target 134. Advantageously, user 10 could monitor the display to ensure that the transformation is correct.

Figure 3:
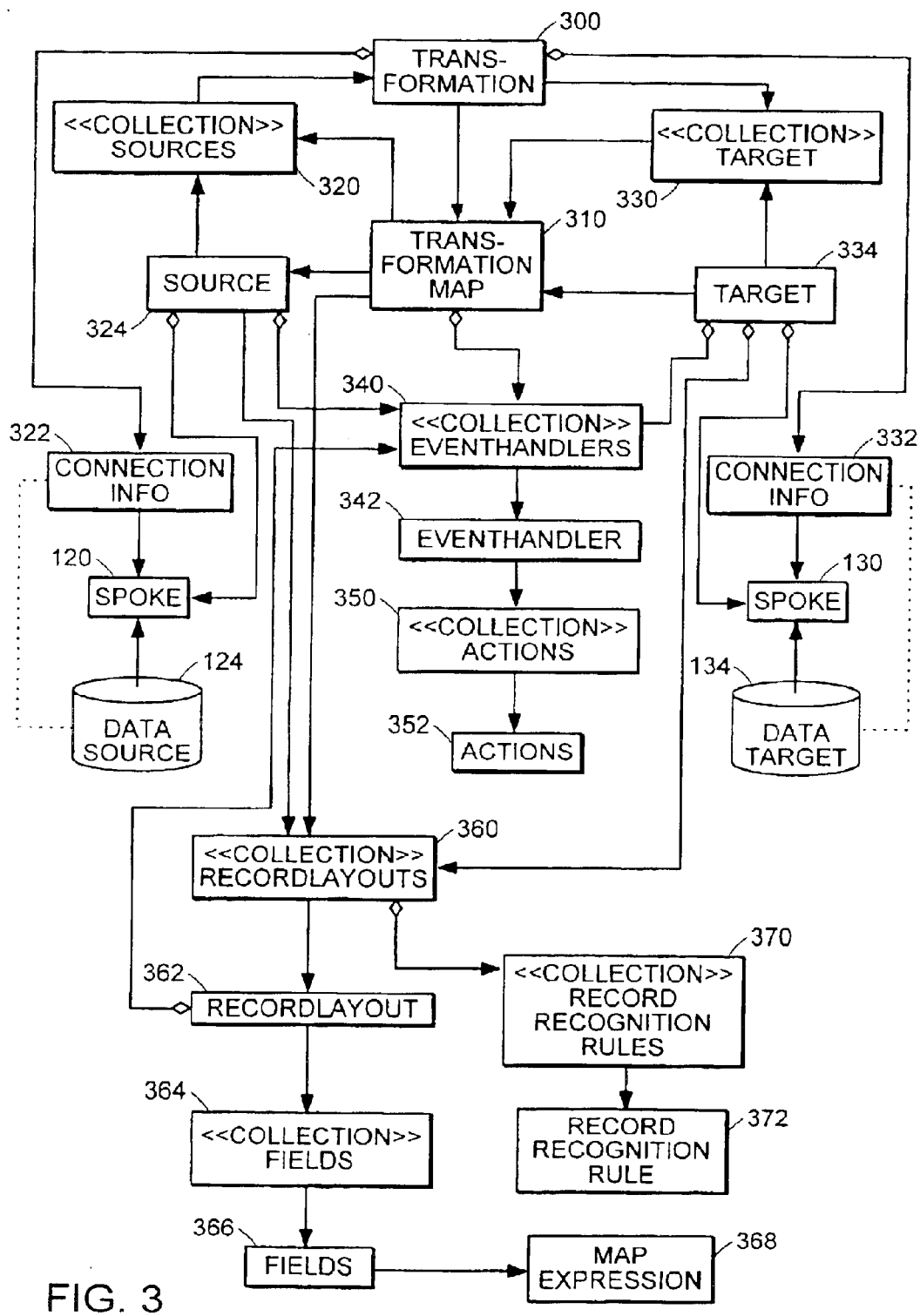
FIG. 3 is a block diagram of a transformation object model according to an embodiment of the present invention.

FIG. 3 is a high-level object model diagram for the objects that participate as part of the design and execution of a transformation according to one embodiment of the present invention.

Transformation object 300 is the root object of the object model. It is responsible for associating a TransformationMap 310 with transformation runtime metadata including transformation execution options, source and target connection information, and source and target record selection criteria. It is also responsible for the loading and execution of transformation maps 310.

Action object 352 is an individual instruction (also called an event action) used in response to a transformation event or an error event during the execution of a transformation. Actions collection 350 is an ordered collection of action objects 352. Each event handler 342 routine consists of an action collection 350.

ConnectionInfo objects 322 and 332 manage information used to connect to data source 124 and data target 134, respectively. ConnectionInfo objects 322 and 332 may be used by source spoke 120 and target spoke 130 to provide access to source object 124 and target object 134, respectively. For simple file-based data sources, this may just be the name of the file (local or remote file system of a URI). For database management systems, this information could most often include the name of the DBMS server, the name of the database, a user ID, a password, and a reference to the DBMS object (table name or a query result). The connection information may also include option settings to control the behavior of the spoke used for the data access.

Spoke objects 120 and 130 are responsible for providing access to the source or target data and metadata. Source spoke 120 is configured to read records and evaluate record recognition rules to determine record types. Target spoke 130 is responsible for updating data target 134 with the transformation results (insert, update, or delete). Both source and target spokes 120 and 130 may also provide information about their capabilities and requirements. This information is used to assist in the design of transformation maps and connection information.

TransformationMap 310 is the root object for the transformation metadata. It is responsible for managing the rules and metadata used for executing a transformation.

EventHandler object 342 manages a collection of actions 350 used to handle a specific type of event. EventHandler object 342 is also responsible for compiling and executing actions 350. EventHandlers 340 is an array of EventHandler objects 342. Five types of EventHandlers 340 are used to handle processing of transformation 300, source 324, target 334, source record layout, and target record layout events.

Generally, the Actions 350 defined in the EventHandlers 340 are used to direct operations in the transformation engine. Permissible Actions 350 may be dictated by several factors, including the capabilities of the transformation engine, and the type of target spoke or adaptor that is used. In some embodiments, a "modal" target adaptor is used. In these embodiments, the type of operation performed by the target adaptor is implied by the current output mode. As described below in more detail, the output mode may be specified when defining the target. Examples of output modes include, without limitation: Replace File/Table—create a new data target or table, OR overwrite both the data and the structure of an existing file or table; Append to File/Table—keep the existing records and add new records to an existing file or table, OR add records to an empty table; Update File/Table—searches an existing data target for a match in the key fields, which the user defines in target keys/indexes, and updates data in the specified manner; Clear File/Table contents and Append—preserves the target record layout and the relationships between tables (if the user has defined them) and discards any existing records; Delete from File/Table—searches an existing data target for a match in the key fields, which the user has defines in target keys/indexes, and deletes data in the specified manner. In some embodiments of the present invention, event actions that may be used with modal target adaptors include, without limitation:

- Abort—used to abort the execution of the execution
- Resume—used within an error event handler to resume execution of an action list which was interrupted by an exception
- Clear—used to clear the values for a target record layout
- Map—execute the mapping expressions for a target record layout
- Put—write a record to a target
- ClearMapPut—a composition action combining the clear, map, and put actions
- Execute—used to execute expression language code
- LogMessage—used to write a message to the transformation log file
- LogTargetRecord—used to display the contents of a target record in the transformation log
- ClearInitialize—used to initialize a target record with default values It is noted that these event actions may perform different functions depending on the active output mode. For example, in a Replace File/Table output mode, the Put command would essentially erase an existing record in the target and write a new record in its place. In contrast, during an Append to File/Table output mode, the Put command would append a new record to the target. In these embodiments, the specification of the target object and the operation on that object may be specified by the target adaptor.

In other embodiments, the specification of the target object and the operation on an object may be specified in the Actions 350 used in the event handlers for the transformation engine. Accordingly, the target spoke or adaptor performs independent of the output mode, hereinafter referred to as a modeless spoke or adaptor. Advantageously, the output mode may be more dynamic because the specification of the object and data operation is deferred to the point where an event handler executes an output action. For example, in embodiments with modeless target adaptors, any sequence of data manipulation operations over any set of target objects may be performed within a single step transformation, rather than one output mode at a time. Further, the same record layout may be used to output to multiple objects. Similarly, it is also possible to define multiple record layouts for use with a single target object. Each record layout can have different mapping expressions and represent different views of the target object. Sharing a record layout between multiple objects can reduce the complexity of a map and using multiple record layouts per object provides greater flexibility in expressing transformation rules. In one particular embodiment, the modeless target adaptors for SQL databases can be configured to write the generated query statements to a script file and/or to execute the query statements as they are generated.

Examples of Actions 350 that may be used with modeless target adaptors may include, but are not limited to:

- Insert Record—inserts the data from the target record memory buffer into a named object. The target adaptor instance, the target object, and the target record type may be specified using three input parameters such as the target adaptor instance, the target object, and the target record type.
- Update Record—uses the data in the target record memory buffer to modify records in the named object. The target adaptor instance, the target object, and the target record type may be specified using three input parameters.
- Delete Record—uses the data in the target record memory buffer to select records in the named object for deletion. The target adaptor instance, the target object, and the target record type may be specified using three input parameters.
- Drop Table—drop a table. The target adaptor instance and the target object may be identified with the input parameters.
- Create Table—create a table. The target adaptor instance, the target object, and target record type may be identified with the input parameters.
- Create Index—create an index. The target adaptor instance, the target object, the target record type, and uniqueness flag may be specified with the input parameters.
- SQL Statement—execute a query language statement. The statement may include embedded expressions from the integration language provided by the transformation engine.
- SQL File—execute a query language statement loaded from file. The statement may include embedded expressions from the integration language provided by the transformation engine.
- MapInsert Record—executes mapping expressions and inserts the resultant values from the target record memory buffer into a named object. The target adaptor instance, the target object, and the target record type may be specified using three input parameters.
- ClearMapInsert Record—clears the target record memory buffer, executes mapping expressions, and inserts the resultant values from the target record memory buffer into a named object. The target adaptor instance, the target object, and the target record type may be specified using three input parameters.

Field object 366 manages the data and metadata for a single field in a record layout. This may include information about the data type of the field, default value, key markers, documentation, and mapping expressions. Fields 364 is an ordered collection of Field objects 366, whereby the collection may be used to define a record layout.

MapExpression 368 may be a piece of code used to derive the value for a specific field in a target record. MapExpression 368 may be used to compile, syntax check, and evaluate the code when the Map action is executed.

RecordLayout object 362 is a named collection of Fields 364. It provides support for storing record layout metadata (name, description, etc.) and provides operations for managing the collections of fields at design time and for evaluating mapping expressions during transformation run time. RecordLayouts 360 is used to manage the collection of record layouts for source 324 or target object 334. RecordLayouts 360 may also serve to associate the record layouts with the rules used to recognize the records.

RecordRecognitionRule object 372 may be used to define an association between a specific record layout and a logical condition. RecordRecognitionRules 370 is the collection of RecordRecognitionRule objects 372.

Source object 324 manages the metadata for a transformation source and provides indirect access to the source data object through a source spoke 120. Sources 320 is the collection of Source objects 324 used for a transformation map.

Similarly, the Target object 334 manages the metadata for a transformation target and provides indirect access to the target data object through a target spoke 130. The Targets 330 is the collection of Target objects 334 used for a transformation map.

Figure 4:
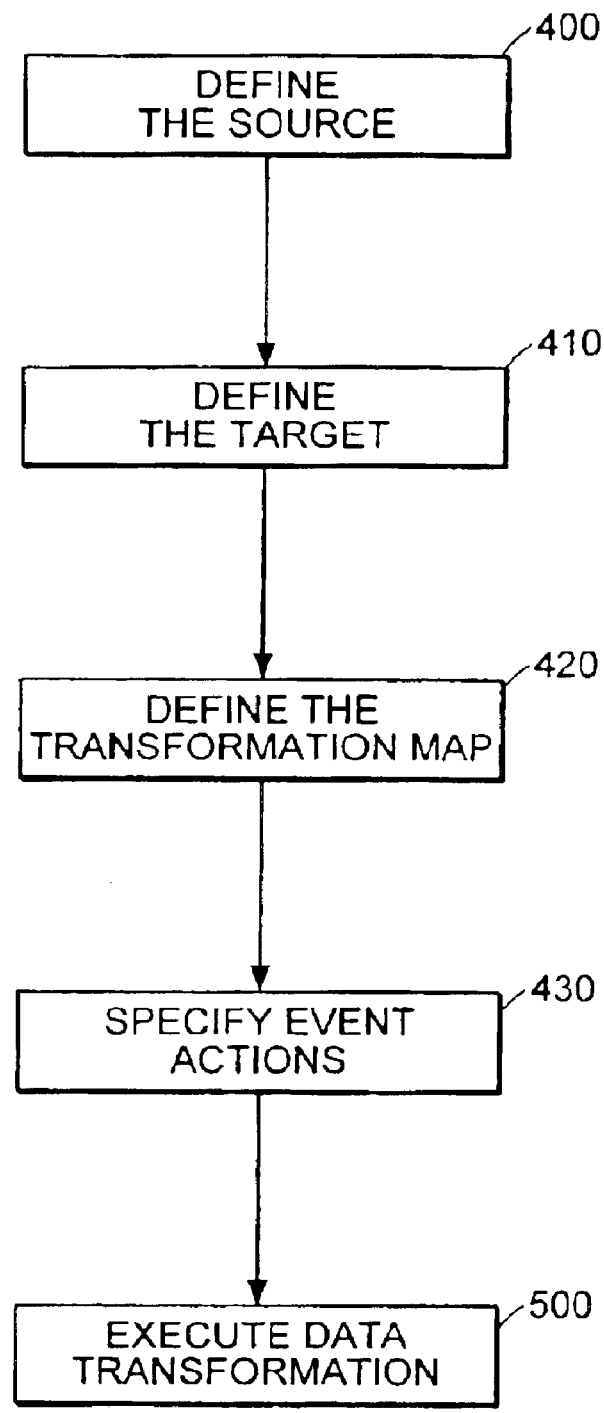
FIG. 4 is a flow chart of a data transformation method according to an embodiment of the present invention.

FIG. 4 is a high level flow chart that depicts the basic process for data transformation according to one embodiment of the present invention. Generally, in the illustrative embodiment, the order of steps 400, 410, 420, and 430 is generally not relevant. As shown, to perform a data transformation, a source must be defined 400, a target must defined 410, a transformation map must be defined 420, event actions must be specified 430, and then the actual data transformation 500 is executed (described in detail in conjunction with FIGS. 5–8).

Defining the Source

Defining the source 400 provides the transformation engine 110 with the information to retrieve data from the data structures in the data source. The specific parameters that must be supplied to define a particular source varies on several factors including, without limitation, the type of data structures used in the source, the presence of a file sniffer, and whether the source is of a commonly used type.

First, the location(s) of the data source(s) must be specified. In many cases the data source may be a file stored on the user's computer or at a remote location (e.g., on a network). In other instances, however, the data source may be a data stream in which case the data stream must be identified, e.g., by name or memory location.

After the data source is located, the source type must be specified. For example, in some embodiments, the user may only have to type in the file name for a delimited ASCII file, or enter table name and passwords if a SQL database is the source. In other embodiments, the user can visually parse records (including binary data) in the case of fixed length ISAM or sequential files. Alternatively, the user can use a dictionary browser to define the source record layout.

The source type may be presented to the user in a list (e.g., a drop-down or pull-down menu). Further, in some embodiments, the source type may be automatically determined by a file sniffer. A file sniffer is a pseudo-spoke object used to determine the file format of files where the file structure is unknown. It uses a set of rules for matching the file content to known file types. If the file type can be determined, the correct spoke object is automatically selected for the user.

The source type the user selects may require additional information to allow the transformation engine to connect, such as a server, User ID or Password. Preferably, spoke objects are implemented to work with a specific data format. The implementation may also include an interface used by the interface to determine what is required by the spoke for connecting to an instance of data. Thus, the spoke objects either contain all of the necessary parameter information or are operable to prompt the user to supply necessary parameters.

For example, the transformation engine may ask the user to define: the server, database directory, database name, user's identification and corresponding password, and/or source table. In some instances, a database may have several tables, and the user must select the table or tables from which the user wants to convert data.

In many cases, the present invention will be able to parse the data of known types of data sources correctly without additional user input. The present invention may be configured to automatically recognize the data structure and formatting or known types of data sources. For various reasons such as data corruption, the parsing may be incorrect. In other instances, the data source may not be of a known type. In both cases, the transformation engine may prompt the user for additional information to define the source. The type of information that is required depends on the types of data structures contained within the source, and of the type of source that is used. For example, the user may be prompted for source properties and source record layout information to define the data structures contained therein.

A source record layout contains information about the data structures in a particular data source. For example, it may contain information about the length of records and fields. The structure of commonly used sources may be predefined. With predefined files, it may be advantageous to prevent the user from making changes to the source record layout unless the user confirms that the data is not parsing correctly. In the case of a flat file or record manager file such as: fixed ASCII, binary, Btrieve, C-tree, C-tree Plus, or COBOL, the user must define the structure of the source data file using one of the following methods. The user may define the source record layout manually (see below), or use an existing record layout.

If the source type is delimited ASCII, the present invention may present the user with a hex browser to determine separators, delimiters and starting offset. Advantageously, the user can use these values to search for the source properties. The user can also determine if there is a header record. A header record contains information, such as column headings, but is not actual data. In addition, by scrolling through the data, the user can view several records. After scrolling through the first few records, the user can usually determine what the separators and delimiters are. Most field separators are printable characters such as a comma (,) or a pipe (|). The user will see printable characters in the single line of data. Some field and record separators are non-printable characters such as a Carriage Return-Line Feed or a Tab. A non-printable character will appear as a period (.) in the line of data, but in the line of hex values above the ruler, the user will see the hex value of that character.

Flat, Fixed ASCII, Binary, and record manager data sources may not be automatically broken into records and/or fields because they do not contain delimiters or separators to mark the locations of field and record breaks. The user must define how the data will be broken up (also called parsed), using the source properties, source record Layout, and source record Parser windows. One way of defining the data structures is through the use of a parsing interface that allows the user to manually parse the data, e.g., by defining record length and starting offset, field sizes, field names, data types, and data properties. Optionally, the parsing interface may include a data browser that parses source data into the data structures defined by the user, allowing the user to verify that the structure is properly defined.

Next, the transformation engine connects to the specified source. Optionally, the present invention may also display data from the source. Advantageously, the user can use this display to verify that the transformation engine is parsing the source data correctly.

Defining the Target

Defining the target 410 is similar to defining the source 400. The transformation engine must be provided with the information it needs regarding the target to which the data will be converted. In one embodiment, the user must specify the target type, name, and data types. In other embodiments, a default predefined data target may be used. In yet other embodiments, the target may automatically be defined to mirror the source.

In embodiments utilizing modal target adaptors, the present invention allows a great deal of flexibility in defining how data is written to the target by allowing the user to specify an output mode. In one embodiment, the output modes may be:

Replace File/Table—create a new data target or table, OR overwrite both the data and the structure of an existing file or table.

Append to File/Table—keep the existing records and add new records to an existing file or table, OR add records to an empty table.

Update File/Table—searches an existing data target for a match in the key fields, which the user defines in target keys/indexes, and updates data in the specified manner. May be particularly useful when the user has selected a dBASE, ODBC, or SQL target type.

Clear File/Table contents and Append—preserves the target record layout and the relationships between tables (if the user has defined them) and discards any existing records. May be particularly useful if the user has selected an ODBC or SQL target type.

Delete from File/Table—searches an existing data target for a match in the key fields, which the user defines in target keys/indexes, and deletes data in the specified manner. May be particularly useful when the user has selected an ODBC, or SQL target type.

Optionally, during the transformation execution 500, the contents of the data source may be displayed so that the user may can verify that the transformation is running properly.

Defining the Transformation Map

The user may define the transformation map 420 by specifying where the data from the source should appear in the data target as well as the relationship between source data and target data. The transformation tells the transformation engine exactly what to write to the target data file. The user can: match source field names to target field names; associate source fields with target fields with different field names and in a different order than they appear in the data source; parse (split) a field; concatenate (merge) fields; perform mathematical calculations; remove unwanted characters; validate date fields; and much more. Source fields that are not mapped to target fields may generally be discarded when the transformation is executed. Alternatively, they may be handled with the reject function (discussed below).

In one embodiment, the user may use a visual mapping interface to drag and drop and to match fields as the user likes (e.g. targetField=sourceField). However, any technique for specifying where source data should appear in the data target is within the scope of the invention. Further, if the user wants to relate source and target fields, the user can create numeric and logical expressions to massage data and fields into the exact output format the user requires. Still further, the user can extract records that meet a logical condition or fall into a range so that only a subset of the total records passing through the transformation engine are written to the data target. In one embodiment, the transformation system may default to a one-to-one mapping between source fields and target fields unless the user specifies otherwise, as this is one of the most frequently used mappings. However, any mapping may be used as the default without departing from the scope of the invention.

Because, in some embodiments, the user can view source and target data at any time in the process and test the results of any manipulations, the user won't waste time executing incorrect transformations. In addition, because, in some embodiments, the user can save the parameters governing a transformation, the user can easily apply the new transformation specifications to future transformations.

The present invention contemplates the use of expressions when defining the mapping between source and target data structures. Expressions allows users to modify the data from its source format to the target format; select records meeting a certain criteria for the data target (filtering); specify actions to be taken when an error occurs; and perform many other functions. Further, if the user wants the result of one expression to be used as a parameter or argument in another expression, the user may "nest" expressions within expressions to produce the desired results. The only limit to the number of expression iterations that may be used is available system memory. In some embodiments, an expression builder interface may be included in the transformation engine to help the user write or generate expressions. The present invention is not limited to any particular programming language or syntax. Accordingly, the present invention is not limited to the syntax of the sample expressions, functions, etc.

When the user specifies an expression in the transformation map, the result of that expression is usually data that is written into the target data file. For example, the simplest expression sets a target field equal to a source field, e.g. Field1=Fields("Field1"). This simple expression instructs the transformation engine to write the data from Field1 in the data source to Field1 in the data target.

In one embodiment, an expression may include any combination of the following elements:

Operands—values or text that the expression operates on. These could be an actual value, such as "4", a field name, or any text string.

Operators—mathematical symbols, text characters or logical statements that tell the transformation engine what to do with the operands in an expression.

Numeric operators—perform calculations with values. Examples include +, −, *, /, and ^ for addition, subtraction, multiplication, division, and exponentiation, respectively. Numeric operators generally return a numeric value.

Logical operators—evaluate a condition. Logical operators include AND, OR and NOT. Logical operators join conditions. The conditions generally return true or false.

Comparison operators—compare two values to determine their relationship. Comparison operators include =, <, >, <=, >=and < > as well as LIKE, and ~(contains) and !~(does not contain). Comparison operators generally return true or false.

Separators—for combining various operations and nested expressions. The user may use parentheses (or some other indicator) in complex expressions to tell the transformation engine the order in which the user wants the expression executed. Expressions inside parentheses are always executed first. For example, in the following expression—

Sub(Chr$(034), " ", [Fieldname])

—the Chr$ function would be executed first.

Functions—for operations that require more complex, automated processing than the user interface can specify. Functions may use the syntax of existing programming languages or may use a syntax or language specific to a transformation system of the present invention. In one embodiment, a special built-in language may be used in expressions for several purposes including manipulating data, handling errors, and filtering records. The functions used in the transformation designer are similar to the functions in Visual Basic, but not identical. Examples of functions in the present disclosure use this language.

Statements—for operations that require more complex, automated processing than the user interface can specify. Similar to functions, statements may use the syntax of existing programming languages or may use a syntax or language specific to a transformation system of the present invention. In one embodiment, the statements use the same special built-in language described above, with the statements similar to, but not identical, to those in Visual Basic. Statements are usually associated with Flow Control and complex expressions.

Literal values (constants)—an exact value, alphabetic or numeric. Examples include, without limitation, 100 or "John Smith". Literal text may be enclosed in quotation marks (" ").

Special characters—allow the user to specify more complex and flexible conditions for matching character strings than simply "Is it the same string, or isn't it?" in an expression. Special characters may include: | (and) * + ? [and] - . \ $ {and}.

Arithmetic operators—used to perform arithmetical calculations on numeric data in a field or fields. They may be used alone or in combination with other operators and Functions in all sorts of expressions. Numeric operands may be promoted to double precision values before performing the operation. If both operands are integer values and the result can be represented as an integer, then the operator will return an integer value. If one or both operands are Null, then the result is Null. All other values may be treated as a numeric value of zero.

+ add
− subtract
* multiply
/ divide two floating point operands
^ exponentiate
\ divide two integers Generally, calculations cannot be performed on data that contains non-numeric characters, or is defined as text data type. However, functions may be available that allow the user to convert data from text to numeric values. Examples of functions that perform calculations follow:

To add the contents of two or more source fields with source fields of "Total" and "Tax" and a target field of "Grand Total":

GRAND TOTAL=[Total]+[Tax]

To multiply the contents of two fields from the data source with source field of "Quantity" and "Price" and a target field of "TOTAL SALE":

TOTAL SALE=[Quantity]*[Price]

To multiply the contents of one field from the data source by a literal value (add 7.25% sales tax) with a source field of "Total" and a target field of "GRAND TOTAL":

GRAND TOTAL=[Total]*1.0725

To divide the contents of one field by the contents of another field from the data source with source fields of "Total Sale" and "Quantity" and a target field of "Price Per":

PRICE PER=[Total Sale]/[Quantity]

It is noted that the preceding examples (along with all of the examples presented herein) are for illustrative purposes only and do not serve to limit the scope of the invention.

Logical operators may be used to specify multiple criteria in an expression. For example, logical operators may be used in extract logic when the user wants to select particular records based on information from two or more fields. Further, logical operators may also be used in target field expressions, in addition to countless other uses.

Three common logical operators include the And operator, the Not operator, and the Or operator. Examples of expressions with logical operators include, but are not limited to:

To select only those records whose [Start Date] equals 01/01/94 and whose [End Date] equals 01/31/94 (within the same record) (the DateValue function may be used to convert text strings to dates):

[Start Date]=DateValue("01/01/94") And [End Date]=DateValue("01/31/94")

To select records when the [Start Date] and [End Date] fields are 'Text' or 'Character' data, enclose dates in quotation marks (here, the DateValue function is not necessary):

[Start Date]="01/01/94" And [End Date]="01/31/94"

To select records where either the first or the second criteria is met. Select records whose [Start Date] field contains 01/01/94, regardless of the [End Date], and all records whose [End Date] field contains 01/31/94, regardless of the [Start Date]:

[Start Date]=DateValue("01/01/94") Or [End Date]=DateValue("01/31/94")

To select records where the [DateofBirth] field is not blank:

Not IsNull([DateofBirth])

Comparison operators may be used to compare the contents in a field to either the contents in another field or a constant. They may be used alone or in combination with other operators and functions in record filtering expressions, target field expressions, and other places where an expression is needed. With the exception of the contains (~) and does not contain (!~) operators, an entire field will be compared, and must match to return true. Contains and does not contain will return true if any part of the field matches the comparison value. These operators can also look for less specific patterns, rather than literal matches. Comparison operators include but are not limited to:

| Operator | Definition |
|---|---|
| = | equal to |
| < > | not equal to |
| >= | greater than or equal to |
| <= | less than or equal to |
| < | less than |
| > | greater than |
| ~ | contains |
| !~ | does not contain |

Examples of Expressions with Comparison Operators Include:

To write this expression in source or target Filters:

Select only the records in which the size field in the data source is exactly "10 mm":
[Size]="10 mm"

Select only the records in which the quantity field in the data source is a numeric value of less than or equal to 1000:
[Quantity]<=1000

Select only the records in which the quantity field in the data source is a numeric value greater than 1000:
[Quantity]>1000

Select only the records in which the quantity field in the data source is a Text field (e.g. an ASCII file) and must be exactly 1000.
Val[Quantity]=1000

Select only the records in which the ordered field in the data source contains values not equal to the values in the shipped field
[Ordered]< >[Shipped]

Select only the records in which the Address field contains "P.O.Box" with or without capitol letters, periods, or spaces. This will convert all records for people who have P. O. Box type addresses.
[Address]~"[Pp]\.* *[Oo]\.* *[Bb][Oo][Xx]"

Select only the records in which the CityStateZip field does not contain a five digit number. This will only convert records that are missing a zip code.
[CityStateZip]!~"[0–9][0–9][0–9][0–9][0–9]"

A concatenation operator (e.g., "&") may be used to concatenate or merge data from two or more fields in the data source into a single field in the data target. Examples of expressions with the concatenation operator include:

To concatenate two fields ("First Name" and "Last Name") from the data source, with a space between the data in the data target:
[First Name] & " " & [Last Name]

To concatenate three data source fields ("City", "State" and "Zip"), with a comma and a space between two of the fields and two spaces between the other two fields:
[City] & ", " & [State] & "  " & [Zip]

A Like operator may be used to compare the value in a field with the value in another field or a literal. It returns true if the value is found anywhere within the field. It does not require an exact match. It also allows a pattern to be matched, not just a literal value. It is very similar to the contains operator, but it uses different special characters, and has different meanings for some of the same special characters. The Like operator may perform a DOS-style comparison. The Like operator may be particularly useful when the user is attempting to write record filtering expressions.

For example, assume that the user has a [State] field in the data source that is a 5 byte field and contains the official two digit abbreviations for states in the United States. Further assume that the user only wants to convert those records for the state of Montana (abbreviated MT). Since the [State] field actually contains two letters and three spaces, the user should use the like operator (instead of the=operator) so the transformation engine will look for the letters "MT" anywhere within those 5 bytes of the field. In record Expression line of the source Filters window, the expression would be written as follows:
[State] Like "MT"

A function generally returns a value based on the results of a calculation or other operation. Common functions include, without limitation, Date, Sub, Left, and Right. In one particular embodiment, the functions used in the transformation designer are very similar to Visual Basic functions. The following is a non-exclusive listing of useful functions used in one embodiment, grouped by category:

Format Text Fields

UCase—convert all letters to upper case

LCase—convert all letters to lower case

InitCaps—convert the initial letter in each word to upper case

Format—convert the data to a specified mask

Format Date Fields

DateValMask—specify that a source field is a date and its mask

DateConvert—convert one format of date to another

Parse (Separate), Rearrange, or Clean Information in Fields

NamePart—parse or rearrange a name field

Add1Part—parse or rearrange a street address field

Add2 Part—parse or rearrange a city-state-zip field

Add1Clean—clean street address fields to USPS standards

Parse—split any type of field at a particular character

Remove Unwanted Spaces from Fields

Trim—remove leading and trailing spaces

LTrim—remove leading spaces

RTrim—remove trailing spaces

Search and Replace Characters in a Field

Sub—substitute one string of characters for another (First occurrence within a field. Special characters can be used to replace patterns.)

GSub—substitute one string of characters for another (All occurrences within a field. Special characters can be used to replace patterns.)

StrReplace—substitute one string of characters for another (Special characters cannot be used. All characters will be treated as their literal values except quotation marks (" ")).

Transliterate—translates characters between two character sets

Use External Lookup Tables

Lookup—allows lookups on character strings using a simple 2-column table

TLookup—allows lookups on character strings using a multi-column table

Xlate—allows lookups on single characters, hex values, and decimal values

Manipulate Data if it Meets a Condition

IIf—specify a condition, then a "true" action and a "false" action

Convert Data to a Specific Data Type

CBool—change to a Boolean data type

CByte—change to a Byte data type

CDate—change to a Date data type

CDbl—change to a Double data type

CInt—change to a Integer data type

CLng—change to a Long data type

CSng—change to a Single data type

Following is a list of additional functions that may be used with some embodiments of the present invention:

| Function | Description |
| --- | --- |
| Abort | Causes a transformation to be aborted or stop running. |
| Abs | Returns the absolute value of a number. |
| Add1Fmt | Cleans (formats) street address fields to USPS standards. |
| Add1Part | Splits (parses) or rearranges a street address field and returns the parts, i.e., number, pre-directional, street name, suffix, post-directional, secondary address unit, and secondary address range. |
| Add2Part | Splits (parses) or rearranges an address field and returns the parts, i.e., city, state, and zip. |
| Asc | Returns the ASCII decimal code (not hexadecimal code) for the first character in a string. |
| CBool | Coerces a string into a Boolean data type. |
| CByte | Coerces a numeric string into a Byte data type. |
| CDate | Coerces a date string into a Date data type. |
| CDbl | Coerces a numeric string into a Double data type. |
| CInt | Coerces a numeric string into an Integer data type. |
| CLng | Coerces a numeric string into a Long data type. |
| CSng | Coerces a numeric string into a Single data type. |
| Choose | Selects a value from a list of values. |
| Chr | Returns a one-character string from the ASCII character corresponding to an ANSI decimal code. |
| Chr$ | Returns a one-character string from the ASCII character corresponding to an ANSI decimal code. |
| Date | Return the current system date. |
| Date$ | Return the current system date. |
| DateAdd | Add or subtract a time interval to or from a date value. |
| DateConvert | Convert one format of date to another. |
| DateDiff | Determine the number of time intervals between two dates. |
| DatePart | Return a part of a date based on a specified time interval. |
| DateSerial | Construct a date value from specified year, month, and day values. |
| DateValMask | Convert formatted date strings into real date values based on a date edit mask. |
| DateValue | Convert a character string representation of a date into a date value. |
| Day | Return the day of the month for a date value. |
| Eval | Evaluates a string expression and returns its value. |
| Exp | Returns e raised to a power. |
| Fix | Returns the integer portion of a number. |
| Format | Formats a number, date, time, or string according to instructions contained in a format expression. |
| Format$ | Formats a number, date, time, or string according to instructions contained in a format expression. |
| GSub (Replace All) | Globally replaces every instance of an expression string in one field of data with a specified string. |
| Hour | Returns an integer between 0 and 23, inclusive, that represents the hour of the day corresponding to the time provided as an argument. |
| Iif | Returns one of two arguments, depending on the evaluation of an expression. |
| InitCaps | Converts the first character of each word to uppercase. |
| InputBox | Displays a dialog box with a prompt, in which the user may input text or choose a button, and then returns the contents of the text box. |
| InputBox$ | Displays a dialog box with a prompt, in which the user may input text or choose a button, and then returns the contents of the text box. |
| InStr (Search) | Returns the position of the first occurrence of one string within another string. |

-continued

| Function | Description |
| --- | --- |
| Int | Returns the integer portion of a number. |
| IsDate | Returns a value indicating whether or not another value can be converted to a date. |
| IsNull | Returns a value that indicates whether or not another value contains the special Null character. |
| IsNumeric | Returns a value indicating whether or not a value variable can be converted to a numeric data type. (−1) yes, (0) no. |
| LCase | Returns a string in which all letters of an argument have been converted to lowercase. |
| LCase$ | Returns a string in which all letters of an argument have been converted to lowercase. |
| Left | Returns the leftmost n characters of a string argument. |
| Left$ | Returns the leftmost n characters of a string argument. |
| Len | Returns the number of characters in a string expression or the number of bytes required to store a variable. |
| Log | Returns the natural logarithm of a number. |
| Log10 | Returns the base 10 logarithm of a number. |
| LogMessage | Creates an entry in the Log File while a transformation is running. |
| Lookup | Look for specific data in a field in the data source, and replace that data in the data target with values from an external table. |
| LTrim | Returns a copy of a string with leading (leftmost) spaces removed. |
| LTrim$ | Returns a copy of a string with leading (leftmost) spaces removed. |
| Mid (Substring) | Returns a string that is part of some other string. |
| Mid$ | Returns a string that is part of some other string. |
| Minute | Returns an integer between 0 and 59, inclusive, that represents the minute of the hour corresponding to the time provided as an argument. |
| Month | Returns an integer between 1 and 12, inclusive, that represents the month of the year for a date argument. |
| MsgBox | Displays a message in a dialog box and waits for the user to choose a button, then returns a value indicating which button the user has chosen. |
| NamePart | Splits (parses) a name field and returns the parts of a full name, i.e., first, middle, last, either to the same field in a different order or to a different field or fields. |
| Now (Timestamp) | Returns a date that represents the current date and time according to the setting of the computer's system date and time. |
| Null | Used to insert a Null value in a field. |
| OptionExplicit | Requires variables be declared with Dim or Global before use. |
| OptionImplicit | Turns off the requirement that variables be declared with the Dim or Global statement before use. |
| Parse (Unstring) | Splits (parses) a string of data in one field on a designated character and returns the parts to a different field or fields. |
| Right | Returns the rightmost n characters of a string argument. |
| Right$ | Returns the rightmost n characters of a string argument. |
| Rnd | Returns a random number. |
| RTrim | Returns a copy of a string with trailing (rightmost) spaces removed. |
| RTrim$ | Returns a copy of a string with trailing (rightmost) spaces removed. |
| Second | Returns an integer between 0 and 59, inclusive, that represents the second of the minute for a time argument. |
| Serial (Increment) | Returns the next serial value. |
| Sgn | Returns a value indicating the sign of a number. |
| Space | Return a string consisting of a specified number of spaces. |
| Space$ | Return a string consisting of a specified number of spaces. |
| Str | Return a string representation of the value of a numeric expression. |
| Str$ | Return a string representation of the value of a numeric expression. |
| StrComp (Compare) | Returns a value that indicates the result of the comparison of two string arguments. |

| Function | Description |
| --- | --- |
| String | Return a string whose characters all have a given ANSI code or are all the first character of a string expression. |
| String$ | Return a string whose characters all have a given ANSI code or are all the first character of a string expression. |
| StrReplace | Replaces one literal string with another literal string. |
| Sub (Replace) | Replaces the first instance of an expression string in one field of data with a specified string. |
| Switch | Evaluates a list of expressions and returns a value or an expression associated with the first expression in the list that is True. |
| TLookup | Allows lookups on character strings using a multi-column table. |
| Time | Returns the current system time. |
| Time$ | Returns the current system time. |
| TimeSerial | Returns the time serial for a specific hour, minute, and second. |
| TimeValue | Returns the time represented by a string argument. |
| Transliterate | Translates characters between two character sets. |
| Trim | Returns a copy of a string with spaces removed. |
| Trim$ | Returns a copy of a string with spaces removed. |
| UCase | Returns a string in which all letters of an argument have been converted to uppercase. |
| UCase$ | Returns a string in which all letters of an argument have been converted to uppercase. |
| Val | Returns the numeric value of a string of characters. |
| ValMask | Returns a numeric value from a formatted string. |
| Weekday | Returns an integer between 1 (Sunday) and 7 (Saturday) that represents the day of the week for a date argument. |
| Year | Returns an integer between 100 and 9999, inclusive, that represents the year of a date argument. |
| XLate | Replaces one character value with another character value based on an external table. These can be specified in hex (\x54), decimal (84) or character ('T') values. |

Further, in some embodiments, the user can use a decision structure to define groups of statements that may or may not be executed, depending on the value of an expression. In these embodiments the transformation engine may support the following: For . . . Next, If . . . Then . . . Else, Select Case, While . . . Wend. In addition the transformation engine may also support the following error-trapping statements: On Error, Goto, Resume, Resume Next, Return.

The user may use expressions to perform a variety of specialized data manipulation or record filtering. For example, in one embodiment, with a single generic Clear-MapPut action, the transformation engine defaults to converting all records in the data source to the data target. However, in this and other embodiments, the user may specify one or more replacement or additional transformation filters. Typical uses for transformation filters include, without limitation, converting records based on a condition, converting a range of records, and converting a random sampling of records. When a transformation is executed (described in detail in conjunction with FIG. 5), the transformation engine may first filter records, and then perform target field expressions to modify the actual data in a particular field. In another embodiment, the user can specify a range on either the source side or the target side of the process. For example, if the user wants the first 100 records from the source and then to extract a subset of those 100 records, the user would set a range in source sample and also set up the record filtering expressions in the target. Conversely, if the user wants the transformation engine to read all the records that meet the record filter expression criteria FIRST, then specify a range of 100 of those records, the user would set the extract logic in the source Filter and the Range in target Filter.

Some embodiments allow for records to be converted based on a condition. Here, a user may use the expression language components to specify an expression that triggers the condition. Generally, expressions written for filtering should be Boolean, with a true return indicating that the record WILL be converted. For example, the following expression—Val([AccountBalance])>"2000"—will convert records where the numerical value of the data in the AccountBalance source field is greater than 2000. If this were the only transformation condition, other records would be discarded when the transformation is run. Following are further examples of transformation conditions used in one embodiment of the present invention:

| Source field Type | Objective and Sample Expression |
| --- | --- |
| numeric | Convert records of customers whose balance falls within a certain range, [BALANCE] >= "150.00" And [BALANCE] <= "2500.00" |
| text | Convert records of customers whose balance fails within a certain range and interpret the field data as numeric instead of text, Val([Balance]) >= "150.00" And Val([Balance] <= "2500.00" |
| date | Convert only records whose date falls within a specified range, DateValue([DATE]) >= "Jan. 1, 1994" And DateValue ([DATE]) <= "Dec. 31, 1994" |
| date | Convert records based on two or more date fields, where the user only want records that contain a specific start and end date, "19941215" in [Field1] and "19940915" in [Field2], DateValMask([Field1], "yyyymmdd") = "19941215" And DateValMask([Field2], "yyyymmdd") = "19940915" |
| text | Convert records based on the date in a single field, where the user only want records that contain dates between two dates, "May 1, 1994" and "May 5, 1994", inclusive, in [Field1], DateValue(Trim([Field1]))>=DateValue(Trim("May, 01, 1994")) And DateValue(Trim([Field1])) <= DateValue(Trim ("May 5, 1994")) |
| numeric | Convert records based on the values in two fields, where the user only want records where the contents of [Field1] are greater than or equal to the contents of [Field2], [Field1] >= [Field2] |

In some embodiments, the user may use a reject function to create two files during a transformation. One file may contain target data records and the other file may contain source records that were rejected when the transformation was run. A record may be rejected for several reasons including, without limitation, the record failing to meet a filtering expression or function, and an error being detected while reading or retrieving a record. Advantageously, the reject function may be helpful when debugging a transformation and for noting data trends.

Other embodiments may include functionality for overflow handling. An overflow occurs when numeric fields in the source have a higher precision than the target numeric fields. The last few digits may be lost or the numeric value may be completely altered. The user may specify rules to handle an overflow occurrence. For example, the user may choose to ignore the overflow, and the transformation will proceed as if the overflow did not occur. The user may choose to treat an overflow occurrence as a warning, and the transformation engine will display a warning message and/or write a message to a log file indicating that an overflow has occurred, but the transformation will continue uninterrupted. Alternatively, the user may choose to treat overflow conditions as an error, whereby the transformation engine will display an error message informing the user that an overflow has occurred and if the maximum error count has been reached, the transformation will be aborted.

Yet other embodiments may include functionality to deal with truncation. Truncation occurs when the size of a target field is smaller than the size of the source field resulting in the last few characters of the source data being cut off. The user may specify the same handling as with the overflow functionality—ignoring, warning, and generating an error.

Optionally, a query language preprocessor may be included to express dynamic queries. For example, in one embodiment, the preprocessor processes a query statement by looking for markers in the SQL statement used to indicate an embedded expression. Each embedded expression is evaluated and the result of expression is substituted for the expression in the query. When all of the expressions have been substituted, the query is passed to the adaptor or spoke for execution.

For example the following SQL query contains an embedded expression referencing the 'Account No' field in the current source record:

delete from accounts where accountid=DJX(Fields ("Account No"));

Assuming the value for 'Account No' is 123456, the preprocessor would translate the SQL query to:

delete from accounts where accountid=123456;

The embedded expressions can be arbitrarily complex. Advantageously, the use of the preprocessor enables even more dynamic queries against the target.

Events

The event handling capabilities of the present invention allow tremendous flexibility in the handling of data. Different actions can be triggered at virtually any point in the transformation process. Messages can be logged, expressions can be executed, possible errors can be traced, normal data manipulation and memory clearing can be done, and the transformation itself can be ended or aborted. The user has complete control over when these actions occur, what actions occur, and how many actions occur. The user may specify a series of one or more trigger events and their associated actions, which is collectively referred to as an event action list. In some embodiments, a default event action list may be used. In yet other embodiments, a previously stored event action list may be used.

Events are opportunities that can be exploited within the transformation cycle. Put another way, they are moments in the timeline of the transformation. For example, if the user wishes something to happen as soon as a record is read into the transformation, the user would choose the AfterNextrecord event, and then choose the action the user wishes to happen at that time.

An advantage of the event handling in the present invention is that it provides for far more complex transformations, e.g., with multiple record types on both source and target, than prior art techniques. Further, the present invention allows these complex transformations to be accomplished with very little difficulty. Examples of complex transformations that may be performed by the present invention include, but are not limited to, record aggregation, unrolling of data, transposing of data, and restructuring. The event handling allows the user much of the flexibility, and customizability that the user would get from a custom coded solution, without the hassle of building a custom program every time the user wishes to convert data.

Events may generally be separated into four types: generic source events, generic target events, transformation events, and specific type events. The generic source and target events are those that may be triggered during the reading and writing from all data sources and data targets, respectively. In contrast, a specific type event is one that is triggered with respect to a particular data source or target, or a specific type of data structure. Transformation events are those that may be triggered during the actual transformation process.

A sample non-exclusive list of events used in one embodiment of the present invention is as follows:

BeforeTransformation—triggered after transformation initialization and before the start of the transformation loop. It may be useful to initialize global variables used in mapping.

AfterTransformation—triggered after the execution of a transformation. It may be useful for freeing resources used in the transformation and for doing other types of clean up.

BeforeNextRecord—a generic source event that occurs just before the next source record is read. It provides an opportunity to initialize variables used in mapping.

AfterNextRecord—occurs as both a generic source event and as a source record type specific event. The generic event is fired after each source record is read. The record specific version of the event is fired only when a record of the specific type is read.

OnEOF—a generic source event that occurs when the transformation engine tries to read past the last record in the source file.

OnError—a generic error event that may be triggered in cases where a more specific error event occurs, but is unhandled (has no associated event actions). It may also be triggered in cases where none of the more specific error events are appropriate.

BeforeMap—may occur as both a generic target event and as a record type specific event, and is triggered just before mapping expressions are evaluated. This event is sometimes used to filter out source records with missing or invalid values.

AfterMap—may occur as both a generic target event and as a record type specific event, and is triggered after mapping expressions are evaluated. This event is sometimes used to validate target values before they are sent to the target.

BeforePutRecord—may occur as both a generic target event and as a record type specific event, and is triggered just before a target record is sent to the target.

BeforePutRecord—may occur as both a generic target event and as a record type specific event, and is triggered just after a target record is sent to the target. This event is sometimes used to reset accumulators.

OnAbort—a generic target event that is triggered whenever the Abort( ) function is called from an expression or when a user manually aborts or cancels the transformation execution.

OnReject—a generic target event that is triggered whenever the Reject( ) function is called. This may provide an opportunity for writing the source record to an exceptions file.

OnDiscard—a generic target event that is triggered whenever the Discard( ) function is called. This provides an opportunity for writing the source record to an exceptions file.

OnOverflowError—may occur as both a generic target event and as a record type specific error event, and is triggered whenever a numeric overflow error is detected.

OnTruncateError—may occur as both a generic target event and as a record type specific error event, and is triggered whenever a truncation error is detected.

OnDuplicateKeyError—may occur as both a generic target event and as a record type specific error event, and is triggered whenever a duplicate key error is detected.

OnNullValueError—may occur as both a generic target event and as a record type specific error event, and is triggered whenever there is an attempt to insert a Null value in a target field that does not allow Null values.

OnConstraintError—may occur as both a generic target event and as a record type specific error event, and is triggered whenever there is an attempt to write a record that does not satisfy the database management integrity rules.

OnAnyDataChange—a source record type specific event that is triggered whenever a data change monitor detects a change in a key value.

OnDataChange1—a source record type specific event that is triggered whenever a first data change monitor detects a change in a key value.

OnDataChange2—a source record type specific event that is triggered whenever a second data change monitor detects a change in a key value.

OnDataChange3—a source record type specific event that is triggered whenever a third data change monitor detects a change in a key value.

OnDataChange4—a source record type specific event that is fired whenever the fourth data change monitor detects a change in a key value.

OnDataChange5—a source record type specific event that is fired whenever a fifth data change monitor detects a change in a key value.

OnAllDataChange—a source record type specific event that is triggered whenever all data change monitors detect a change in a key value.

OnMismatch—fired whenever a Delete Record or an Update Record fails to match any records in the target object. This event is useful for situations where it is desirable to modify a record if it exists and to add it if it does not. In such cases the OnMismatch event handler would include an Insert Record action to add the new record.

Event actions are actions that the user wishes to be executed at a specific moment or moments in the transformation. An event action's associated triggering event determines when the event action will be executed. Triggering events may be, but are not limited to, any of the events listed above. For example, if the user wishes a message to be placed in the error and event log every time a record is discarded, the user would choose the OnDiscard target event and the LogMessage action. Most actions can be triggered by any event that the transformation system is capable of detecting. A sample non-exclusive list of event actions used by one embodiment of the present invention is as follows:

Execute—executes an expression that the user specify.

ClearMapPut—combines the functionality of Clear, Map, and Put in one action. The target record buffer is cleared, target field expressions are executed, and the resulting data is written out to the data target.

MapPut—executes target field expressions, assigns the resulting data to target fields and writes the data to the data target, but does not clear the buffer.

If data from previous records is assigned to fields that do not exist in the most recently read record, all of that data will be written along with the data from the most recently read record.

Clear—clears the contents of a target record memory buffer.

Map—executes target field expressions and assigns the resulting data to target fields in the memory buffer.

Put—writes the data in the target record memory buffer into the data target.

Resume—causes the transformation to continue normally after an error is detected.

Terminate—ends the transformation without aborting it. If the transformation is transactional, it will not roll back, but will end normally. If there is an action associated with an AfterTransformation event, it will be executed.

Abort—causes the transformation to abort. If the transformation is transactional, the transaction will be rolled back. If there is an action associated with the AfterTransformation event, it will not be executed.

LogMessage—writes a message that the user specify to the error and event log file.

LogTrgRec—writes current target record buffer field values into the error and event log file. This may be useful for diagnostic purposes.

TraceOn—turns on error tracing so that details about each record transformation will be written in the error and event log file.

TraceOff—turns off error tracing and returns the logging to its normal state.

In one embodiment, when doing a standard one-record-type-to-one-record-type transformation, the user may not need to specify any event actions at all. In this embodiment, a ClearMapPut action may automatically be executed for the user when the user runs the transformation. Any action or set of actions may be specified as the default.

Generally, event actions may be processed in a predetermined order, which is dependent on the triggering event. If multiple actions are associated with a single event handler, the actions may be executed in the order in which they are defined. In some embodiments, the user may modify the order of execution.

In addition to being flexible, the event handling interface is preferably designed to be easy to use. The user chooses the event that the user wishes to have trigger an action, and then chooses the action and defines its parameters. Screen interfaces may be used to help the user define the parameters of each action as it is chosen. The user can choose to have more than one action occur during a particular event, and the user can choose to have the same action occur during more than one event. The present invention imparts no restrictions on the number or type of event actions or triggering events that may be used.

In addition, the transformation engine may allow users to create, save, and run completed transformations, which contain all the information it needs to successfully transfer data from one application to another application. It is common for users to have a need to run the same transformation process on a repetitive basis.

Further, in some embodiments, either the user or the transformation engine may generate metadata regarding a transformation. In these embodiments, this metadata may be stored with the transformation and/or recorded in any logs that generated. One example of metadata is the version information, which allows the user to specify portable transformation specifications and their associated revision numbers. Thus, when the user revises a transformation specification and wants to make sure that its date and type are traceable, the user can specify both major and minor transformation revisions. For example a major revision may be numbered in whole numbers, e.g., 1, 2, 3, etc., and a minor revision may numbered with decimals, e.g., 1.1, 1.2, etc. This information may allow the user to keep designed transformations synchronized with transformations being executed by the transformation engine.

Executing the Transformation

The actual transformation process of the present invention is iterative. The transformation engines retrieves a single piece of source data (e.g., a field, record, or other data structure) at a time while detecting occurrence of triggering events until all of the data sources have been retrieved. Advantageously, the transformation engine does not have to load all of the source data structures into memory at once.

Figure 5:
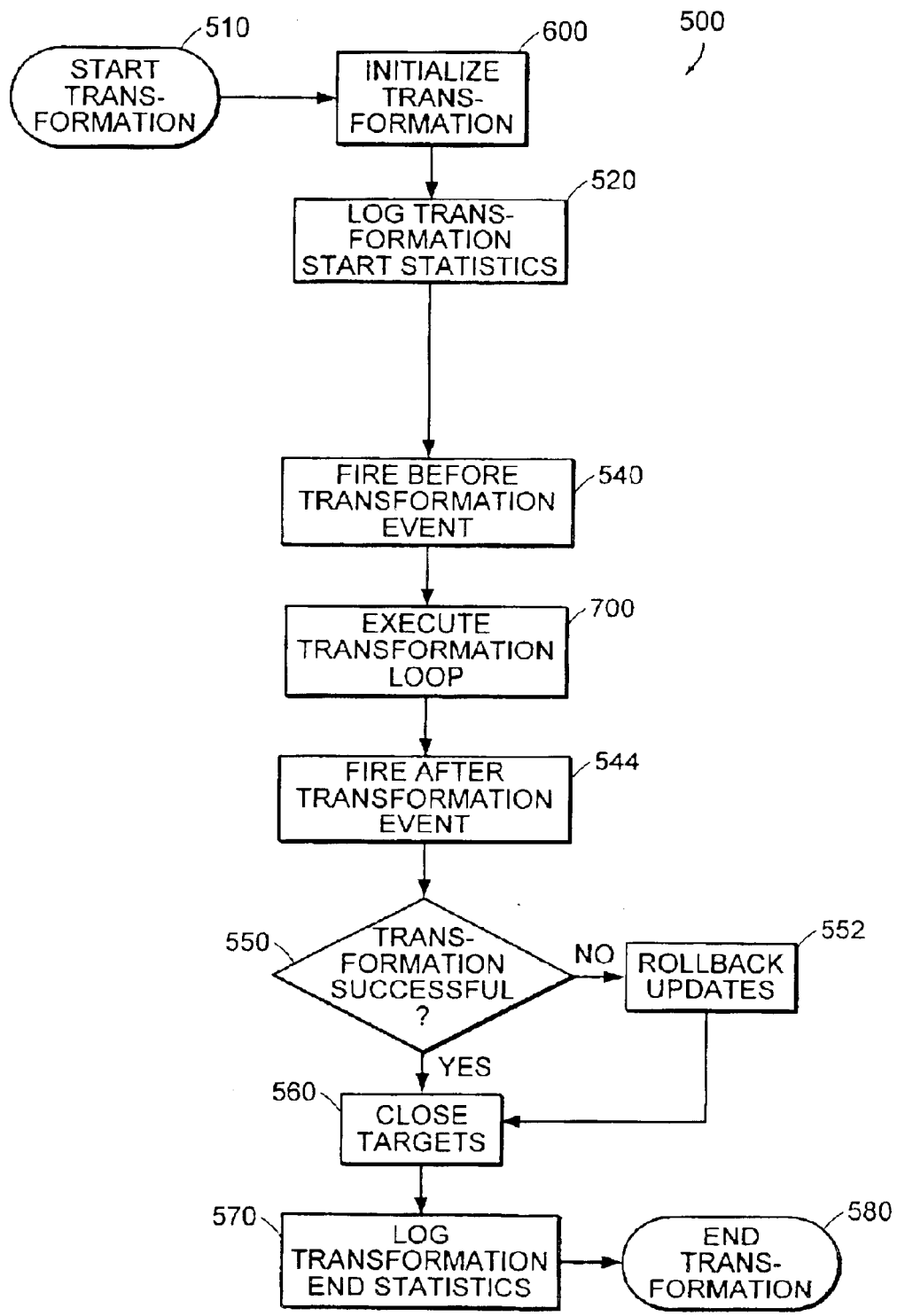
FIG. 5 is a flow chart depicting the transformation process according to an embodiment of the present invention.
Figure 6:
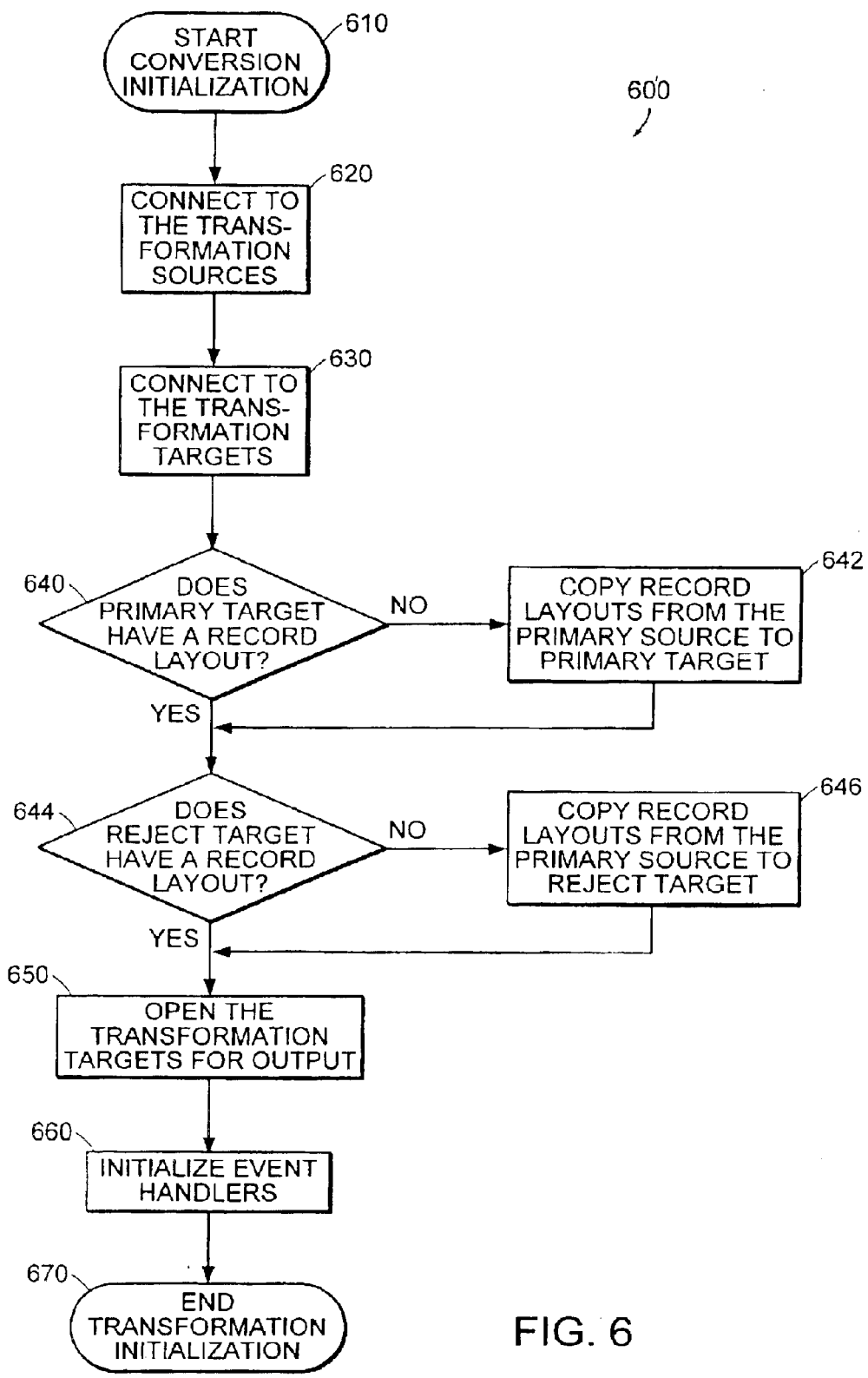
FIG. 6 is a flow chart depicting the process used to initialize a transformation for execution according to one embodiment of the present invention.

FIG. 5 is a detailed flow chart that depicts execution of a transformation 500 according to one embodiment of the present invention. Generally, after the necessary transformation information has been specified (steps 400, 410, 420, and 430), the transformation may be initiated 510. The first step of the transformation is initialization 600. The flow chart in FIG. 6 depicts the details of transformation initialization 600 according to one embodiment of the present invention.

Once the transformation initialization is started 610, it establishes connections 620 and 630 to transformation sources and transformation targets, respectively. The embodiment shown in FIG. 6 makes use of a primary target and a reject target. Reject targets may be used to store records that do not pass a filter or otherwise are not written to a primary target. Reject targets are often useful in debugging and data analysis. Accordingly, the next inquiries 640 and 644 are whether both of the targets (i.e., the primary and reject) have record layouts specified for them. The illustrated embodiment is configured to use (642 and 646) the source layout for the targets, if none has been specified. In other embodiments, different default actions may be used, including, without limitation, requiring that the user select or specify a layout, and simply generating an error event. After establishing record layouts, the data targets are opened in preparation to receive output 650.

Next, the event handlers are initialized 660. Event handlers are used to detect and handle the occurrence of event actions and error events.

Returning to FIG. 5, after the initialize transformation routine 600 is completed, the system may log the transformation and start logging statistics 520. Though this step is optional, it may be useful in many cases for debugging purposes.

Next, a BeforeTransformation event may be fired 540 to allow for event actions before the transformation to take place. For purposes of the present invention, the term "fired" is synonymous with triggered. It is also noted, that the events depicted in this embodiment are merely illustrative and are not required—the present invention does not limit the types of events or actions that may be used.

Figure 7:
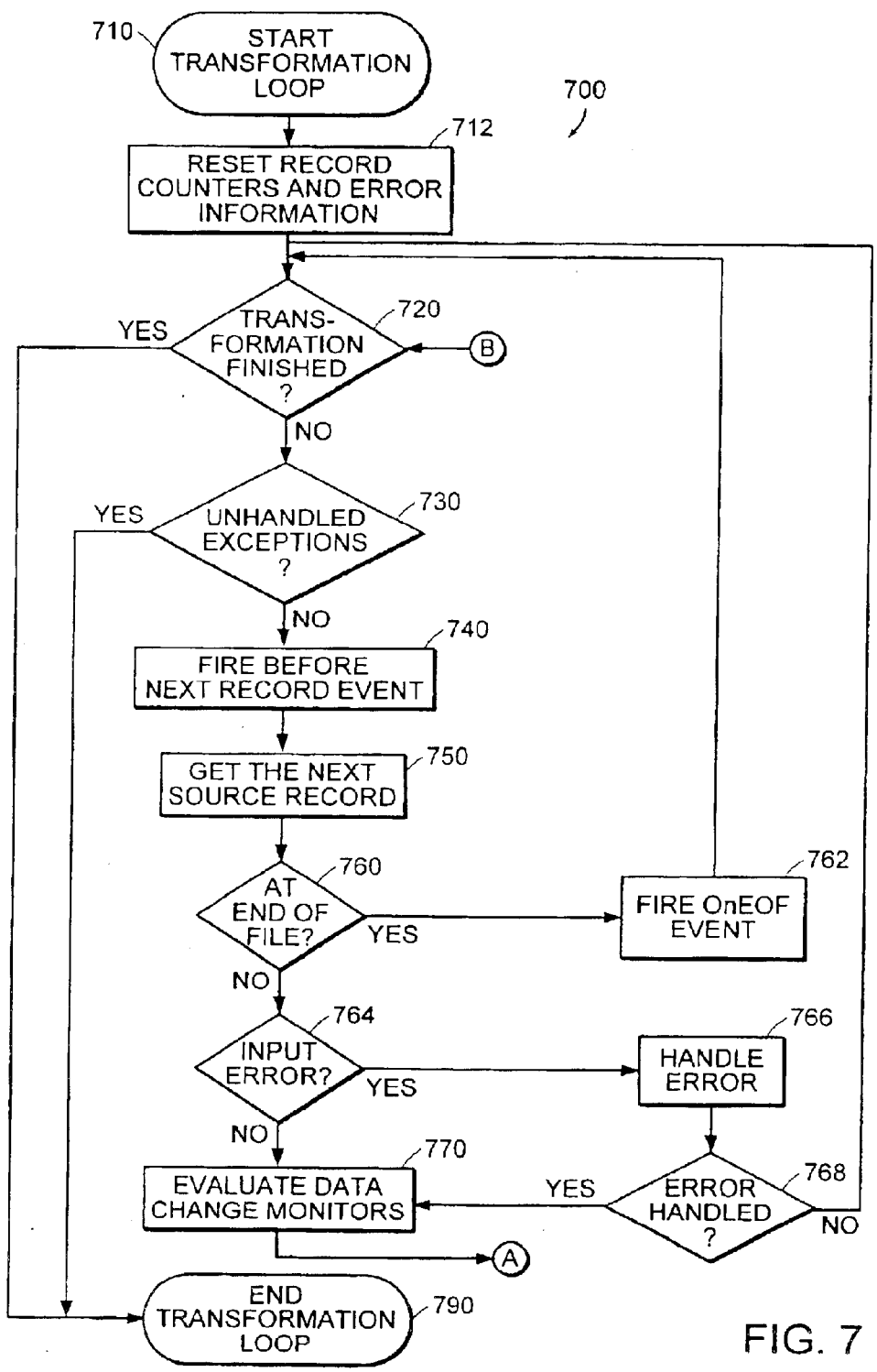
FIG. 7 is a flow chart depicting one portion of the transformation loop process according to one embodiment of the present invention.

Next, transformation loop 700 is entered. Transformation loop 700, described in more detail in FIG. 7, is one way that the transformation engine can iterate through the data sources. Record counters and error information are reset 712 at the start 710 of the loop. The loop continues until it determines that the transformation is finished 720.

In the loop, the presence of unhandled exceptions are checked 730. An unhandled exception is any error event for which there is not suitable event handler defined. These untrapped errors cause the transformation to terminate abnormally. If there is an unhandled exception, the transformation loop ends unsuccessfully.

If there are no unhandled exceptions, the system may fire a BeforeNextRecord event 740 and retrieves the next source record 750. By iterating through the data source(s) on a record-by-record basis, the whole data source does not have to be read into memory. Further, this also allows for easy navigation of hierarchical data structures, as the present invention can keep track of relationships between records. As the transformation process of the present invention iterates over records from the data source, the last instance of each distinct record type may be remembered. Thus, in instances where data is either hierarchical or there is an implied parent-child relationship, mapping expressions may address the data from any of the ancestors from the last record. Though records are a commonly used data structure, particularly with database sources, any size or type data structure may be read in step 750.

Next, if the end of the source file is detected 760, an EOF event may be fired 762. If no other data source files remain then the transformation loop is ended 790, otherwise the loop proceeds to step 730.

If the end of the source file is not detected 760, retrieved source record 750 is checked for input error 764. If input error is detected, it is handled 766 by one or more error handlers. An error handler is similar to an event handler in that it is designed to detect occurrence of an event (i.e., an error condition) and execute the appropriate action. The appropriate action may be specified by the user or may be predefined. If the input error is handled then the loop moves on to the same step (770) as if the input error did not occur. If the input error is not handled 768, the transformation loop may be ended 790 unsuccessfully.

Figure 8:
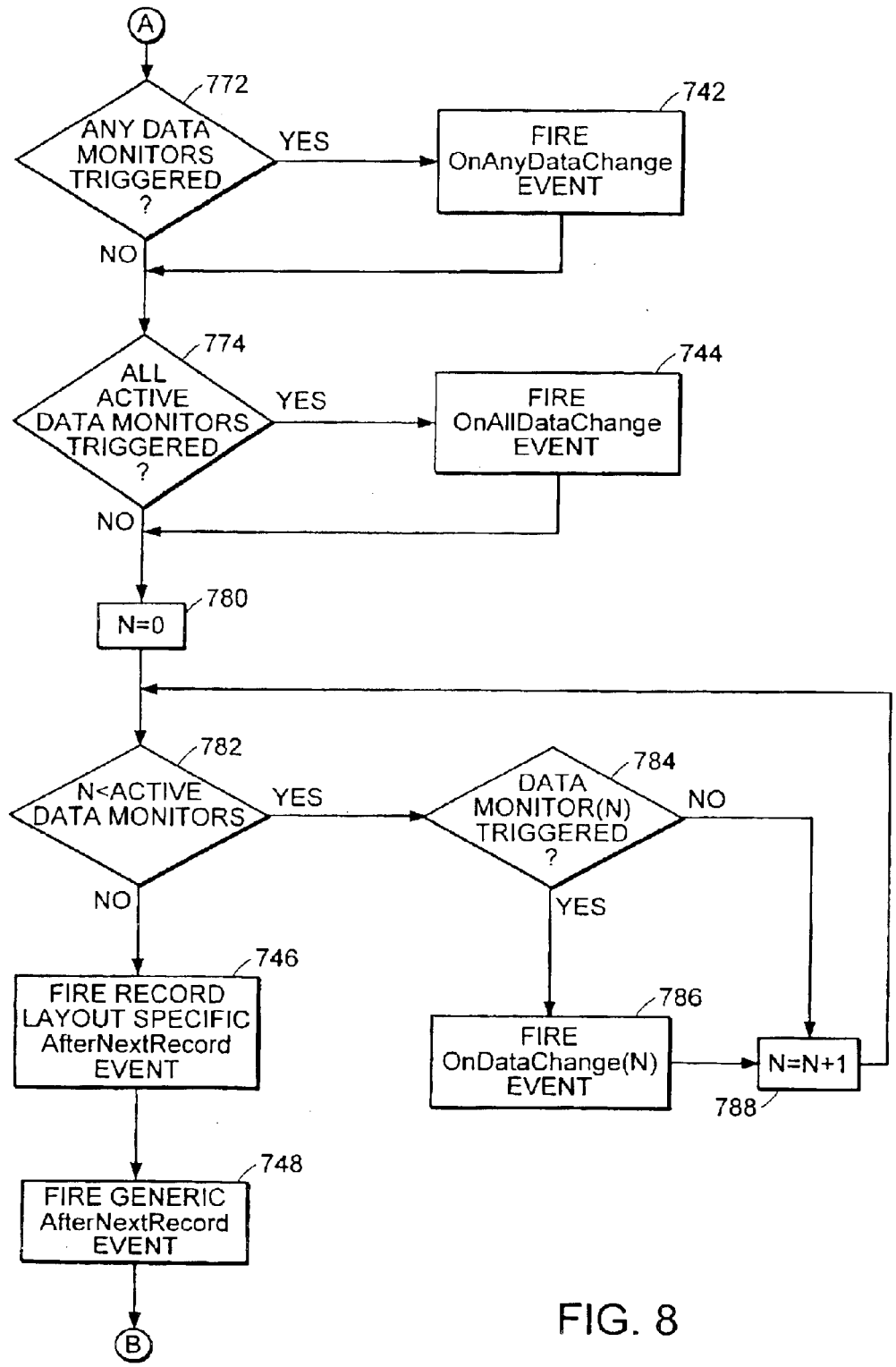
FIG. 8 is a flow chart depicting the other portion of the transformation loop process according to one embodiment of the present invention.

If the input error is handled successfully 768 or if there is no input error 764, data changes are evaluated by monitors 770 to determine if any data monitors are triggered 772 (see FIG. 8). This allows for OnAnyDataChange events to be triggered 742. If all of the active data monitors are triggered, an OnAllDataChange event may be fired 744. If not, a sub-loop (780, 782, and 788) may be executed that checks whether each individual data monitor has been triggered 784, and if so, fires the appropriate OnDataChange event 786. After the sub-loop has executed, a record-layout-specific AfterNextRecord event 746 may be fired, followed by a generic AfterNextRecord event 748.

After transformation loop 700 executes, an AfterTransformation event 544 may be fired.

If the transformation was successful 550, the targets are closed 560, the transformation end statistics may be logged 570, and the transformation is ended 580. If it was not successful, the updates may be rolled back 552, putting all of the objects back in the states they were in before the transformation was started 510.

TRANSFORMATION EXAMPLES

Included in this section are examples that illustrate the flexibility of the present invention. The syntax and formatting in the examples are not limitative as to the scope of the present invention.

The first example listed below depicts a simple mapping from a data source "SR1" to a data target "TR1" having the same data structures:

| Source Layout SR1 | | Target Layout TR1 |
|---|---|---|
| PartNo | NUMERIC(6) | TPartNo NUMERIC(6) |
| Name | TEXT(128) | TName TEXT(128) |
| Cost | NUMERIC(9,2) | TCost NUMERIC(9,2) |

TR1 Mapping Expressions
TPartNo=Sources(0).Records("SR1").Fields("Part No")
TName=Sources(0).Records("SR1").Fields("Name")
Tcost=Sources(0).Records("SR1").Fields("Cost")
SR1.AfterNextRecord Event Handler
a ClearMapPut("Target","TR1")
After the transformation is executed (e.g., as described above with respect to FIG. 5), the source and data target would contain the following information:

| SOURCE DATA | | | DATA TARGET | | |
|---|---|---|---|---|---|
| PartNo | Name | Cost | TPartNo | TName | TCost |
| 980123 | CDRW | 32.00 | 980123 | CDRW | 32.00 |
| 980522 | MODEM | 75.00 | 980522 | MODEM | 75.00 |
| 980331 | MOUSE | 26.00 | 980331 | MOUSE | 26.00 |

The next example illustrates the use of a more complex mapping that incorporates functions:

| Source Layout SR1 | | Target Layout TR1 |
|---|---|---|
| PartNo | NUMERIC(6) | Items INTEGER |
| Name | TEXT(128) | Total NUMERIC(9,2) |
| Cost | NUMERIC(9,2) | |

TR1 Mapping Expressions
Items=Targets(0).Records("TR1").Fields("Items")+1
Total=Targets(0).Records("TR1").Fields("Total")+
　　Sources(0).Records("SR1").Fields("Cost")
BeforeTransformation Event Handler
Clear ("Target","TR1")
SR1.AfterNextRecord Event Handler
Map("Target","TR1")
OnEOF Event Handler
Put("Target","TR1")
After this transformation is executed, the data source and data target would contain the following information:

| DATA SOURCE | | | DATA TARGET | |
|---|---|---|---|---|
| PartNo | Name | Cost | Items | Total |
| 980123 | CDRW | 32.00 | 3 | 133.00 |
| 980522 | MODEM | 75.00 | | |
| 980331 | MOUSE | 26.00 | | |

In this example, because of the nature of the function, data is only stored (i.e., with the PUT action) once, after the entire data source has been read.

The next example illustrates the transformation of a source XML document to a target flat ASCII file. The XML data source in this example has three levels in the document tree. The header record (PO record) is formed by mapping values from the root level of the tree and from the BillingAddress sub-tree. The detail records are formed by mapping the Item sub-tree of the XML document.

XML DATA SOURCE
```
<?xml version="1.0" encoding="ISO-8859-1"?>
<PurchaseOrder>
    <Data>May 25, 2000</Date>
    <Billing Address>
        <Name>Fred's Computer Shop</Name>
        <Street>2901 Burnet Rd.</Street>
        <City>Austin</City>
        <State>TX</State>
        <Zip>78759</Zip>
    <Items>
      Item>
          <Quantity>3</Quantity>
          <ProductNumber>980123</ProductNumber>
          <Description>Floppy Drive</Description>
          <UnitCost>32.00</UnitCost>
      </Item>
      <Item>
          <Quantity>1</Quantity>
          <ProductNumber>980331</ProductNumber>
          <Description>128M SDRAM</Description>
          <UnitCost>129.00</UnitCost>
      </Item>
    </Items>
</PurchaseOrder>
```

| Target Layout PURCHASE ORDER | | Target Layout DETAIL | |
|---|---|---|---|
| RecordType | TEXT(1) | RecordType | TEXT(1) |
| Date | TEXT(10) | PartNo | NUMERIC(6) |
| Name | TEXT(50) | Name | TEXT(128) |
| Street | TEXT(50) | Units | NUMERIC(6) |
| City | TEXT(25) | Cost | NUMERIC(9,2) |
| State | TEXT(2) | | |
| Zip | TEXT(5) | | |

PURCHASE ORDER Mapping Expressions

RecordType="H"

Date=Records("Date").Fields("Data")

Name=Records("BillingAddress").Fields("Name")

Street=Records("BillingAddress").Fields("Street")

City=Records("BillingAddress").Fields("City")

State=Records("BillingAddress").Fields("State")

Zip=Left$(Records("BillingAddress").Fields("Zip"),5)\
DETAIL Mapping Expressions RecordType="D"

Part No=Records("Item").Fields("ProductNumber")

Name=Records("Item").Fields("Name")

Units=Records("Item").Fields("Quantity")

Cost=Records("Item").Fields("UnitCost")
BillingAddress.AfterNextRecord event handler ClearMapPut ("Target","PO")
Item.AfterNextRecord event handler ClearMapPut ("Target", "Detail")

After the transformation is executed, the data target would contain the following:
Fixed ASCII Data Target

| | | |
|---|---|---|
| H2000/05/25Fred's Computer Shop 901 Burnet Rd. Austin TX 78759 | | |
| D980123Floppy Drive | 3 | 32.00 |
| D9803311128M SDRAM | 1 | 129.00 |

This example illustrates that the present invention permits a hierarchical document to be restructured into a target with multiple record types. This is also an example of a many-to-many record type transformation.

Project Designer Interface

In other embodiments (not shown), the transformation engine may include a graphical "project" designer, allowing easy visual design and control of very complex end-to-end transformation Projects consisting of multiple steps. Sophisticated flow control enables the transformation engine steps (transformations) and non-steps to be assembled in a logical and dependent order for easy automation and deployment of batch executions. The project designer interface is a management tool for arranging the complete job of transforming data from one format to another. Users can use it to organize the transformation engine transformations with logical choices, SQL queries, global variables, Microsoft's DTS packages, and any other applications the user might need to complete the data transformation task. Once the user has organized these steps in the order of execution, then the user can execute, or even automate, the entire workflow sequence as one unit.

A transformation designer can be called from within the project designer interface, allowing for transformations to be created or edited in the transformation designer and the new information passed back to the appropriate transformation step in the project designer interface. All transformations needed for a project can be designed from within the project designer interface. Thus, the project designer interface can be used from beginning to end to make the data transformation task simpler and more streamlined.

Alternatively, template transformations can first be created and saved in the transformation designer. From within the project designer interface, those transformations can then be called and edited or overrides created and associated with individual steps in the project. These changes in the transformation can be saved in the transformation engine database as part of the original transformation (edited), or the changed information can be passed back to the transformation step in the project designer interface without altering the original template transformation (overridden), at the user's discretion.

The first step in designing a transformation using the project designer interface is to consider what will be necessary to accomplish the complete job of transforming the data. It is useful for users to determine what needs to be done first, which applications will be needed, and what decisions will need to be made. When the user has a good sense of the strategy plan for transformation, the user should invoke the project designer interface. Project steps can be re-arranged, deleted, added, or edited as the user go along.

The general steps to design a project using the project designer interface are as follows: set the appropriate properties for a step—for example, if it is a transformation step, the user can invoke a transformation designer interface, create the transformation, edit the transformation, and set any overrides from a transformation properties menu; select another project step from the toolbar and click on the grid to place it and set the appropriate properties; repeating until all project steps have been set up; stepping through the execution; validating the project to make sure all of the essentials of a complete project are there; saving the project, if desired; and running the project, if desired.

The transformation engine includes a feature that allows users to combine multiple steps into a single complex transformation project. This feature is provided by the addition of a new visual project designer interface component and by enhancements to the existing transformation engine (the transformation engine) and transformation engine API (the transformation engine SDK) components.

The project designer interface provides an easy-to-use visual interface for the design, execution, and management of complex transformation projects. The user interface for the project designer interface includes both a project manager and a project design tool. In one embodiment, these tools may be configured to run on the Windows 95/98 and Windows NT operating systems.

The project manager allows the user to quickly see all of the projects in the transformation engine database. The manager uses an explorer-style interface to allow the user to navigate to the stored transformations and peruse some of the high-level project content. The user is able to perform basic management operations on the database contents (new, delete, edit, export, import, rename, etc.). Additionally, the user is able to convert existing transformation batches into projects.

The project design tool represents the transformation projects using process flow diagrams. The user may define a project using a simple diagramming interface. Each step in the transformation project may be represented as symbols similar to those used in flowcharts. The process flow is described using lines to connect the symbols for each of the project steps. Transformation project diagrams will serve both to document the project and to define how the project executes.

Transformation projects created through the project designer interface may support several types of project steps:

Start. This is a special step that represents the starting point for a transformation project. It may also be used for the definition and initialization of global project variables used to pass information between different project steps.

Transformations. Users may be able to create new transformation steps or use existing transformation specifications. Transformation steps may be able to share session information with other transformation steps to simplify the specification of login information and to facilitate the coordination of transactions across the entire project.

Decision. The decision step provides a way for project to conditionally control the project flow using an if-then-else logic. Decision steps support the use of simple expressions to test for branch conditions. Expressions may have access to information stored, global variables, and completion code information from prior steps to determine which branch of the process flow continues execution.

Expression. Expressions can be evaluated to compute values or to execute functions from an external library. Expressions have access to global project variables.

Application. The application step allows users to incorporate the execution of external applications such as schedulers, electronic mailers, sort utilities, bulk loaders, and indexing utilities.

SQL Statement. The SQL statement steps may provide an effective mechanism for users to execute SQL DDL for the SQL resources used in a project. Users may be able to define tables, indexes, primary keys, and relational constraints. The combination of the SQL statement steps and the transformation steps make it possible for the transformation engine to populate entire databases at one time.

Sub-Project. The use of sub-projects may allow smaller projects to be combined into bigger projects and provides a mechanism for project reuse. Sub-projects may also serve to give the user greater control over how transactions are coordinated between multiple transactional steps.

Stop. The stop step represents the end of a project. It can be used to specify project termination expressions.

The transformation engine SDK may be enhanced to support new API functions for the execution and management of projects and project steps. Following is a non-exclusive list of preliminary API functions according to one embodiment of the present invention:

LoadProject Loads a Project from persistent storage files.
UnloadProject Unloads the Project from memory.
ExecuteProject Executes the Project
GetProjectName Retrieves the Project Name
GetProjectAuthor Retrieves the Project Author
GetProjectDate Retrieves the Project Creation Date
GetProjectDescription Retrieves the Project Description
GetProjectVersion Retrieves the Project Version
GetProjectTransactionIndicator Retrieves an indicator of whether the Project is transactional or not.
Get/SetProjectLogFile Accessors for the Project Log File path and filename.
Get/SetProjectLogMask Accessors for the Project Log Mask.
Get/SetProjectPersistentStorageRootDirectory Accessors for the Project Persistent Storage Root Directory property.
ValidateProject Validates the Project.
AbortProject Aborts Project execution.
GetProjectErrorCount Retrieves the Error Count for the Project.
GetProjectLastErrorMessage Retrieves the Last Message logged for the Project.
LogProjectMessage Logs a message to the Project log file.
GetProjectSessionList Retrieves a list of global Sessions defined on the Project.
GetProjectSessionCount Retrieves the number of global Sessions defined on the Project.
GetProjectSession Iterates over global Sessions returning the handle (name) one at a time.
SetProjectStepSession Overrides the Session on a specified Step
GetProjectStepList Retrieves a list of Project Steps.
GetProjectStepCount Retrieves the number of Steps defined on the Project.
GetProjectStep Iterates over the Project Steps returning the handle (name) one at a time.
Get/SetGlobalVariable Accessors for Project global variable values.

Following is a non-exclusive list of step level API functions according to one embodiment of the present invention:

GetProjectStepName Retrieves the Name of a Step.
GetProjectStepType Retrieves the Type of a Step.
GetProjectStepDescription Retrieves the Description of a Step.
GetProjectStepSession Retrieves the Session of a Step.
Get/SetProjectSteptransformationName Accessors for the transformation name on input transformation Step.
GetProjectStepAuthor Retrieves the transformation author on input transformation Step.
GetProjectStepDate Retrieves the transformation Creation Date on input transformation Step.
Get/SetProjectStepFile/Table Accessors for the transformation File or Table on input transformation Step and source or target indicator. Could also use for SQL File on SQL Step.
Get/SetProjectStepQueryStatement Accessors for the transformation Query Statement on input transformation Step and source or target indicator. Could also use for Query Statement on SQL Step.
GetProjectStepFilterCount Retrieves the number of filters on an input transformation Step and source or target indicator.
GetProjectStepFilter Iterates over the filters returning one at a time on an input transformation Step and source or target indicator.
GetProjectStepSampleType Retrieves the sample type on an input transformation Step and source or target indicator.
GetProjectStepSampleStart Retrieves the sample start on an input transformation Step and source or target indicator.
GetProjectStepSampleCount Retrieves the sample count on an input transformation Step and source or target indicator.
Get/SetProjectStepInitializationFile Accessors for an initialization file property on input Start Step.
Get/SetProjectStepTerminationFile Accessors for a termination file property on input Stop Step.
Get/SetProjectStepCommandLine Accessors for the command line property on input Application Step.
Get/SetProjectStepParameters Accessors for the parameter list property on input Application Step.
Get/SetProjectStepTimeoutIndicator Accessors for the timeout indicator on an input Application or SQL Step.
Get/SetProjectStepTimeoutSeconds Accessors for the timeout seconds on an input Application or SQL Step.
Get/SetProjectStepExpression Accessors for Expression for Decision and Expression Steps. Need list capabilities for Expression Step.

Data Replication and Synchronization

The problem of replication and synchronization is one of change management. Updates made on one data store need to be logged and propagated to each replicant. There are a variety of techniques for tracking changes including change data capture and transaction log mining. In all cases, the changes can be represented as a sequence of inserts, deletes, and modifications. Most data replication solutions are concerned with replication of data between like data stores. In a system where the replicants store data in different formats, using a transformation tool to transform the changed data to data manipulation operations on each replicant may be the best solution to the problem of heterogeneous replication.

Embodiments of the present invention address this problem by providing a mechanism for performing any sequence of data manipulation operations on one or more objects. In particular, the use of the event-driven framework and the mode-less adaptors makes this possible without the need for complex scripting or custom code.

Application Integration

Modern techniques for integrating disparate applications usually perform integration on an object level. In a typical business to business (B2B) scenario, two trading partners might exchange purchase orders and invoices as electronic documents. Each trading partner is likely to have a different backend accounting system. To facilitate the exchange of documents, it is necessary for each trading partner to agree on a common interchange format for the electronic documents. This makes it necessary for each of the partners to have a way to transform data to and from their accounting system to the interchange format.

In these types of situations, a transformation tool can be used to import and export the interchange format. Given that a document may represent data from many parts of the backend system, an effective transformation tool must be able to perform a variety of data manipulation operations on several objects and do so in a transactional manner. For many situations, it is also necessary to generate new unique identifiers for objects that are imported into the backend system.

Embodiments of the present invention address this problem by providing a mechanism for performing any sequence of data manipulation operations on one or more objects. Additionally, in some embodiments of the present invention, individual objects may be treated transactionally with the use of modeless adaptors.

The preceding examples are included to demonstrate specific embodiments of the invention. It should be appreciated by those of skill in the art that the techniques disclosed in the examples which follow represent techniques discovered by the inventor to function well in the practice of the invention, and thus can be considered to constitute preferred modes for its practice. However, it should be understood that the invention is not intended to be limited to the particular forms disclosed. Rather, the different aspects of the disclosed compositions and methods may be utilized in various combinations and/or independently. Thus the invention is not limited to only those combinations shown herein, but rather may include other combinations. Further, those of skill in the art should, in light of the present disclosure, appreciate that many changes can be made in the specific embodiments which are disclosed and still obtain a like or similar result without departing from the spirit and scope of the invention.

REFERENCES

The following references, to the extent that they provide exemplary procedural or other details supplementary to those set forth herein, are specifically incorporated herein by reference:

Bernstein, Philip A. and Eric Newcomer, Principles of Transaction Processing (1997).
Goldfarb, C. F., The SGML Handbook (1990).
Linthicum, David S., Enterprise Application Integration (2000)
McGrath, S., Parseme, 1st: SGML for Software Developers (1998)
  XSL Transformations (XSLT), Version 1.0, W3C Recommendation (16 Nov. 1999) (URL, as of Aug. 31, 2000, http://www.w3.org/TR/1999/REC-xslt-19991116)

What is claimed is:

1. A system for data transformation, comprising:
  one or more read spokes, each read spoke configured to connect to one or more data sources, wherein each data source has one or more data structures referred to collectively as source structures;
  one or more modeless write spokes, each modeless write spoke configured to connect to one or more data targets, wherein each data target has one or more data structures referred to collectively as target structures; and
  a transformation engine operatively coupled to the one or more read spokes for retrieving data from the one or more data sources, and coupled to the one or more modeless write spokes for storing data in the one or more data targets, comprising:
    a data transformation map that comprises one or more mappings relates one or more source structures to one or more target structures; and
    an event list, comprising one or more event actions, each with a corresponding triggering event, wherein the transformation engine is configured to:
      iterate through the data sources and detect occurrence of triggering events; and
      in response to the detection of triggering events, execute the respective one or more event actions from the event action list.

2. The system of claim 1, wherein the transformation engine further comprises a query language preprocessor operable to review the data transformation map and evaluate embedded expressions in the one or more mappings.

3. The system of claim 1, wherein at least one of the event actions, referred to as a transformation event action, comprises:
  retrieving at least one source structure from the data source;
  transforming said at least one source structure, referred to as transformed source data;
  storing said transformed source data in one or more target structures; and
  wherein said transformation engine is operable, in response to a transformation event action, to transform data specified by said transformation event action in a manner described in the data transformation map.

4. The system of claim 1, further comprising a user interface configured to allow a user to define the one or more data sources, and to define data structures in each of the one or more source databases.

5. The system of claim 1, further comprising a user interface configured to allow a user to define the one or more data targets, and to define data structures in each of the one or more target databases.

6. The system of claim 1, further comprising a user interface configured to allow a user to define the relationship between one or more data sources and one or more data targets.

7. The system of claim 6, wherein the user interface is further configured to allow the user to relate source structures to target data structures.

8. The system of claim 7, wherein the user interface is further configured to graphically depict the relation between the source structures and the target structures specified in the transformation map.

9. The system of claim 6, wherein the user interface is further configured to define the relationship between one or more data sources and one or more data targets as a logical expression.

10. The system of claim 6, wherein the user interface is further configured to define the relationship between one or more data sources and one or more data targets as a numeric expression.

11. The system of claim 1, wherein the transformation engine is further configured to show the contents of the data source and the contents of data structures in the data target on a display of the system.

12. The system of claim 1, wherein at least one of the triggering events is a generic source event.

13. The system of claim 1, wherein at least one of the triggering events is a generic target event.

14. The system of claim 1, wherein at least one of the triggering events is a generic transformation event.

15. The system of claim 1, wherein at least one of the triggering events is a specific source record event.

16. The system of claim 1, wherein the transformation engine is further configured to filter the data retrieved from the data source, the data passing the filter referred to as filtered source data, and is further configured to iterate through only the filtered source data.

17. The system of claim 16, wherein the transformation engine is further configured to filter the data using predetermined sampling parameters governing a range.

18. The system of claim 16, wherein the transformation engine is further configured to filter the data using a predetermined a logical extraction criteria.

19. The system of claim 1, wherein the read spokes may connect to the one or more data sources by utilizing a raw sequential mode wherein an intuitive visual parser reconstructs record layouts.

20. The system of claim 1, wherein the read spokes may connect to the one or more data sources by utilizing a compatible physical file format allowing the transformation engine to physically read from the one or more data sources using the native internal storage format.

* * * * *